(12) United States Patent
Pauli

(10) Patent No.: US 11,878,657 B1
(45) Date of Patent: Jan. 23, 2024

(54) DEVICES AND METHODS TO STORE AND TRANSPORT ARTICLES

(71) Applicant: Richard B. Pauli, Hayward, WI (US)

(72) Inventor: Richard B. Pauli, Hayward, WI (US)

(*) Notice: Subject to any disclaimer, the term of this patent is extended or adjusted under 35 U.S.C. 154(b) by 0 days.

(21) Appl. No.: 17/819,585

(22) Filed: Aug. 12, 2022

Related U.S. Application Data

(63) Continuation-in-part of application No. 16/900,307, filed on Jun. 12, 2020, now Pat. No. 11,414,021.

(60) Provisional application No. 62/861,188, filed on Jun. 13, 2019.

(51) Int. Cl.
  *B60R 9/045* (2006.01)
  *B60R 9/08* (2006.01)

(52) U.S. Cl.
  CPC ............ *B60R 9/045* (2013.01); *B60R 9/08* (2013.01)

(58) Field of Classification Search
  CPC ......... B60R 9/048; B60R 9/052; B60R 9/058; B60R 9/08; B60R 9/10; B60R 9/12; B60R 9/04; B60P 3/10; B60P 3/1008; B60P 3/1006
  USPC .................................. 224/324–327, 329–330
  See application file for complete search history.

(56) References Cited

U.S. PATENT DOCUMENTS

| | | | | |
|---|---|---|---|---|
| 4,146,198 A * | 3/1979 | Bott | ........................ | B60R 9/04 296/3 |
| 5,292,045 A | 3/1994 | Mandel | | |
| 5,497,925 A * | 3/1996 | Lumpe | ...................... | B60R 9/04 224/326 |
| 6,164,507 A * | 12/2000 | Dean | ........................ | B60R 9/08 224/570 |
| 6,250,528 B1 * | 6/2001 | Lumpe | ...................... | B60R 9/04 224/326 |
| 6,561,396 B2 * | 5/2003 | Ketterhagen | ........... | B60R 9/042 414/547 |
| 6,622,898 B1 * | 9/2003 | Wang | ...................... | B60R 9/045 224/325 |
| 8,136,708 B2 | 3/2012 | Sautter et al. | | |
| 9,187,047 B2 | 11/2015 | Sautter et al. | | |
| 9,266,478 B2 | 2/2016 | Patel | | |
| 9,975,494 B2 * | 5/2018 | Connors | ................... | B60R 9/08 |
| 10,246,025 B1 | 4/2019 | Knigge et al. | | |
| 10,322,662 B2 * | 6/2019 | Lasley | ................... | B63C 13/00 |
| 10,343,617 B2 * | 7/2019 | Cox | ......................... | B60R 9/10 |
| 10,780,837 B2 * | 9/2020 | Sautter | ................. | B60R 9/0426 |
| 2003/0173384 A1 | 9/2003 | Clark et al. | | |

(Continued)

*Primary Examiner* — Scott T Mcnurlen
(74) *Attorney, Agent, or Firm* — DeWitt LLP; Brian R. Pollack, Esq.

(57) ABSTRACT

The disclosure provides a rack system for securing articles. The rack system can include a longitudinal elongate rail traversing a longitudinal direction, and a lateral rail adjustably mounted to the elongate rail. The lateral rail can be orthogonally oriented (or obliquely oriented) with respect to the longitudinal elongate rail. The lateral rail can be configured to be mounted at a plurality of longitudinal positions along the longitudinal rail. The rack can further include one or more upwardly extending brackets that are adjustably mounted to the lateral rail. The upwardly extending bracket(s) can be mounted at one or more lateral positions along the lateral rail. The lateral rail and the upwardly extending bracket(s) cooperate to form a concavity for at least partially surrounding a portion of an article to hold the article in position when mounted to the system.

13 Claims, 29 Drawing Sheets

(56) References Cited

U.S. PATENT DOCUMENTS

| | | | |
|---|---|---|---|
| 2005/0082325 A1* | 4/2005 | Bourne | B60R 9/08 224/319 |
| 2010/0193555 A1* | 8/2010 | Gift | B60R 9/08 224/322 |
| 2014/0144959 A1* | 5/2014 | Sautter | B60R 9/045 224/321 |
| 2015/0089779 A1 | 4/2015 | Lawrence et al. | |

* cited by examiner

DEVICES AND METHODS TO STORE AND TRANSPORT ARTICLES

CROSS-REFERENCE TO RELATED APPLICATIONS

The present patent application is a continuation-in-part of and claims the benefit of priority to U.S. patent application Ser. No. 16/900,307, filed Jun. 12, 2020 and issued as U.S. Pat. No. 11,414,021 on Aug. 16, 2022, which in turn claims the benefit of priority to U.S. Provisional Patent Application No. 62/861,188, filed Jun. 13, 2019. Each of the aforementioned patent applications is hereby incorporated by reference herein in its entirety for any purpose whatsoever.

BACKGROUND

Various attempts have been made at designing specialty roof racks for the safe storage and transport of personal water craft (e.g., kayaks, crew shells and the like). However, Applicant has come to appreciate that current approaches have considerable limitations. The present disclosure improves upon the state of the art.

SUMMARY

Aspects of the present disclosure relate to, among other things, the safe storage and transport of personal watercraft, including but not limited to kayaks and crew shells. Those of skill in the art will recognize that the present disclosure encompasses the safe storage and transport of other articles as well.

Thus, in some aspects, the disclosure provides a rack system for securing articles. The rack system can include a longitudinal elongate rail traversing a longitudinal direction, and a lateral rail adjustably mounted to the elongate rail. The lateral rail can be orthogonally oriented (or obliquely oriented) with respect to the longitudinal elongate rail. The lateral rail can be configured to be mounted at a plurality of longitudinal positions along the longitudinal rail. The rack can further include one or more upwardly extending brackets that are adjustably mounted to the lateral rail. The upwardly extending bracket(s) can be mounted at one or more lateral positions along the lateral rail. The lateral rail and the upwardly extending bracket(s) cooperate to form a concavity for at least partially surrounding a portion of an article to hold the article in position when mounted to the system.

If desired, the system can further include one or more brackets to removably mount the longitudinal elongate rail to a support. In some implementations, the lateral rail and the at least one upwardly extending bracket can have a flat cross-section, but other shaped cross sections may be used, such as circular, rectangular and the like. The lateral rail can be narrower in width than the upwardly extending bracket(s) to permit lengthwise edges of the at least one upwardly extending bracket to overlap and pass beyond lengthwise edges of the lateral rail to permit the components to be slid over one another. However, it will be appreciated that the system can be configured such that the lateral rail can be wider than or the same width as the upwardly extending bracket(s).

In some implementations, the longitudinal elongate rail can act as or otherwise define a longitudinal track to permit the lateral rail to slide along the longitudinal direction. Similarly, the lateral rail can act as or otherwise define a lateral track to permit the upwardly extending bracket(s) to slide along the lateral direction so they can move away from or toward one another along the lateral rail.

In some implementations, the upwardly extending bracket(s) can be straight or curved and defines a concave shape for receiving a portion of the article to be stored or transported. The upwardly extending bracket(s) can be bent to define a plurality of straight (and/or curved) sections that cooperate to define a concave shape for receiving the portion of the article. The components of the brackets are preferably removable from the elongate rail, so as to permit the elongate rail to remain attached to a support without the presence of any of the bracket hardware.

In further implementations, the system can further include one or more integral or removable pads. These pads can be removably attached to an inner surface of the upwardly extending bracket(s), the lateral rail, or a strap or sling that is used to hold the article in place within the system. The pad(s) can be shaped and positioned to conformably receive a portion of the article being stored or transported.

In some implementations, two upwardly extending brackets can be provided wherein a removable pad is attached to each of the brackets. The pad can be configured as a sling, or a cradle between the two brackets.

As alluded to above, the system can further include one or more straps. Each strap can have a first end attached to one of the brackets and a second end configured to be routed about the brackets to traverse around the article to be stored or transported and attached to the first end of the strap, such as via an adjustable buckle.

In further implementations, the system can include a supplementary bracket for coupling to an accessory on the article being transported, such as the outrigger on a canoe. The supplementary bracket can be attached at a first end to the longitudinal elongate rail, and can include a second end for receiving the outrigger. The bracket can also be coupled to an upwardly extending bracket of the system, as described in further detail below.

If desired, the system can further include a padded end at each end of the longitudinal elongate rail to prevent collision between ends of the longitudinal elongate rail and a hood or hatch of a vehicle when the hood or hatch of the vehicle is raised. In accordance with a further embodiment, the system can further include one or more oar cradles adjustably attached to at least one of the longitudinal elongate rail and the lateral rail.

The disclosure further provides a system for storing articles or carrying articles on top of a vehicle, for example. The system includes a longitudinal elongate rail traversing a longitudinal direction, and a lateral rail adjustably mounted to the elongate rail. The lateral rail can be obliquely or orthogonally oriented with respect to the longitudinal elongate rail, for example. The lateral rail can be configured to be mounted at a plurality of longitudinal positions along the longitudinal rail. The system can further include a length of padding removably mounted to the lateral rail. The length of padding can be configured and arranged to cushion a portion of an article when the article is mounted onto the system. If desired, the system can further include one or more brackets for removably mounting the longitudinal elongate rail to a support.

The disclosure further includes methods of mounting an article to a storage location or the roof of a cart or vehicle such as a motor vehicle or a trailer. In some implementations, the method includes attaching a longitudinal elongate rail to a support, such as the roof rack of a vehicle. The longitudinal elongate rail traverses a longitudinal direction, such as parallel to a length of the vehicle. The method further includes attaching a lateral rail to the elongate rail. The lateral rail can be orthogonally or obliquely oriented with respect to the longitudinal elongate rail. The lateral rail can be configured to be mounted at a plurality of longitudinal positions along the longitudinal rail. The method further includes attaching at least one upwardly extending bracket to the lateral rail to form a concavity for receiving the article. The at least one upwardly extending bracket can be configured to be mounted at a plurality of lateral positions along the lateral rail. The method can further include mounting the article to the at least one upwardly extending bracket.

In some implementations, attaching the lateral rail to the elongate rail can include sliding the lateral rail along the elongate rail to a desired position, and affixing the lateral rail in place with respect to the elongate rail. Attaching the at least one bracket to the lateral rail can include sliding the at least one upwardly extending bracket along the lateral rail to a desired position and affixing the at least one upwardly extending bracket in place with respect to the lateral rail. The method can further include, for example, affixing a padded sling to the at least one upwardly extending bracket, the padded sling being configured for receiving a bottom surface of the article.

It is to be understood that the foregoing general description and the following detailed description are exemplary and are intended to provide further explanation of the disclosed embodiments. The accompanying drawings, which are incorporated in and constitute part of this specification, are included to illustrate and provide a further understanding of the disclosed methods and systems. Together with the description, the drawings serve to explain principles of the disclosure.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

DETAILED DESCRIPTION

The present disclosure is drawn, in various implementations, to systems and related methods for attaching articles to supports, vehicles, carts, or trailers, for example. Reference now will be made in detail to aspects of the present disclosure, examples of which are illustrated in the accompanying drawings. Wherever possible, the same reference numbers will be used throughout the drawings to refer to the same or like parts. As used herein, the terms "comprises," "comprising," or any other variation thereof, are intended to cover a non-exclusive inclusion such that a process, method, article, or apparatus that comprises a list of elements does not necessarily include only those elements, but may include other elements not expressly listed or inherent to such process, method, article, or apparatus. The term "exemplary" is used in the sense of "example," rather than "ideal."

Figure 1:
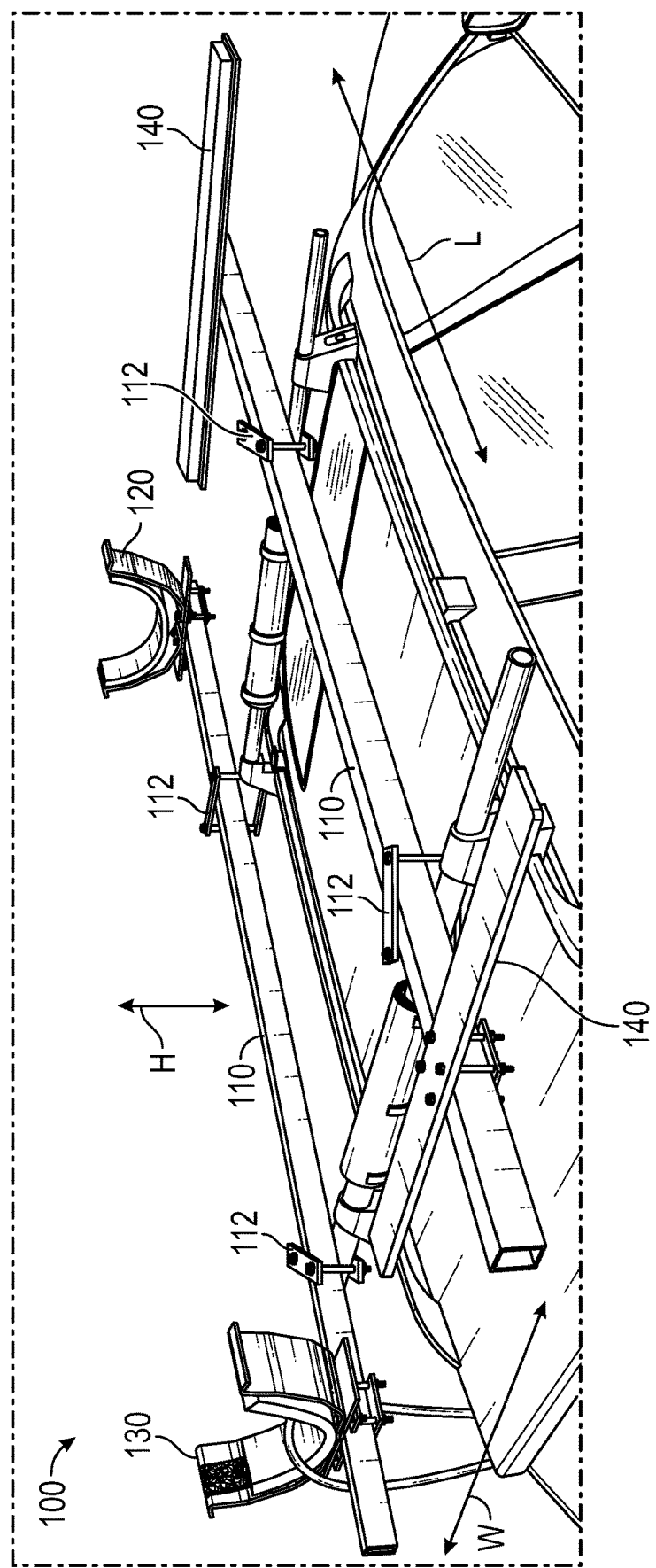
FIG. 1 is a first perspective view of embodiments of systems in accordance with aspects of the present disclosure.

For purposes of illustration, and not limitation, an illustrative, non-limiting example of a rack system 100 for securing articles is presented in FIG. 1. While the embodiments in the figures are illustrated for use with respect to personal watercraft, such as paddle boards, canoes, crew shells, surf skis and kayaks, it will be appreciated that the disclosed embodiments are suitable for use with any cumbersome elongate objects, particularly if they are fragile or easily damaged. Also, even though the disclosed rack systems are illustrated as being used on top of a vehicle roof rack, it will be appreciated that the rack system can be used on carts, trailers in applications for moving articles, as well as be used in stationary storage applications, such as inside garages and storage buildings, or out in the open so as to resist wind forces and the like. While the illustrated embodiments include structural components and mechanical fasteners formed from aluminum alloy, it will be appreciated that different materials can be used, such as other metals, plastics, and the like, and that the cross-sectional shape of each of the structural members can be varied as desired depending upon the application for the system.

Figure 26:
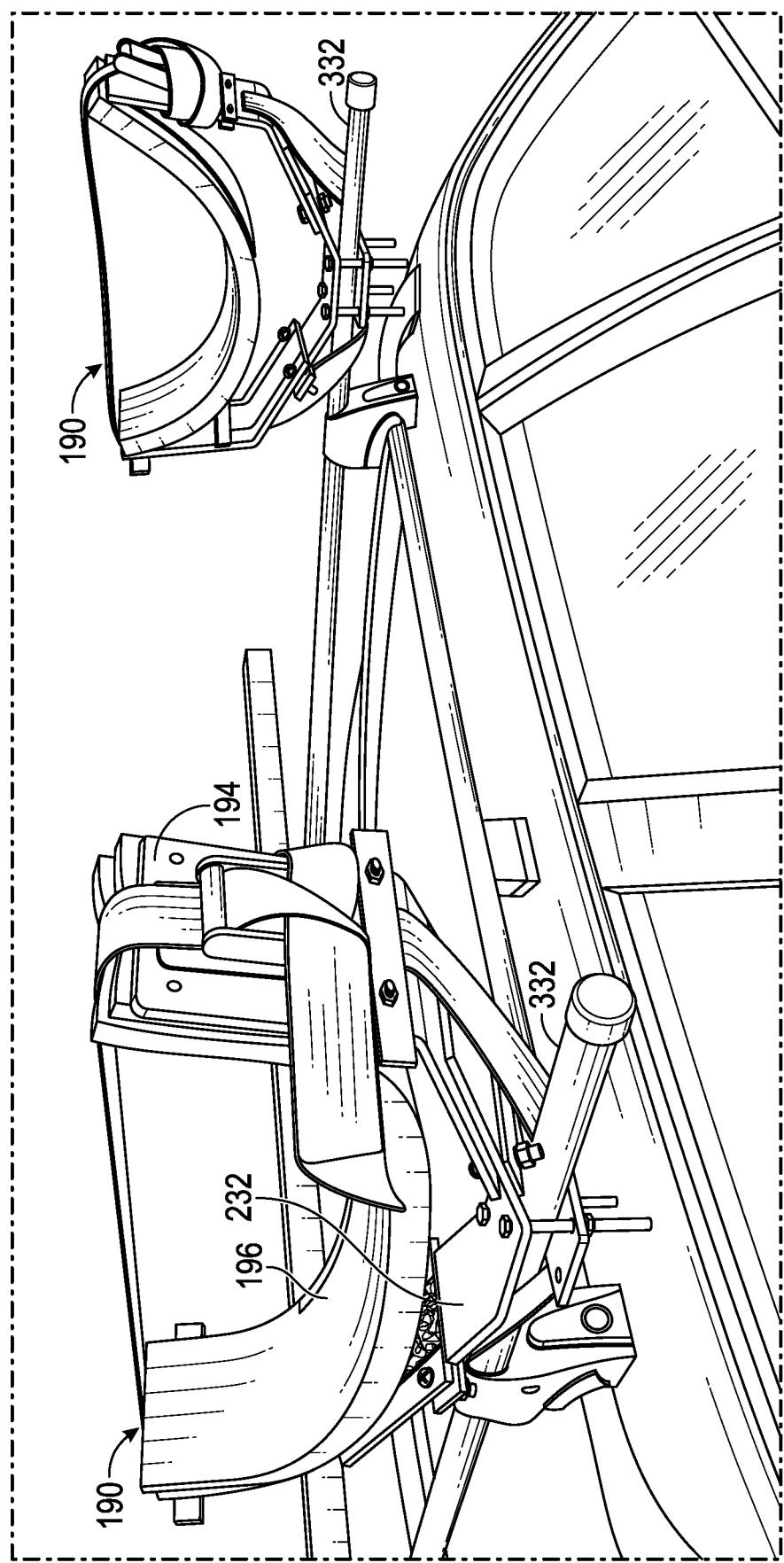
FIG. 26 is a perspective view of two brackets as illustrated in FIG. 25 mounted to lateral rails of a roof rack system.

With continuing reference to FIG. 1, a system (100) for securing articles can include a longitudinal elongate rail (110) traversing a longitudinal direction. The longitudinal rail can be a part of a system that is added to an existing roof rack. Alternatively, the elongate rail can be a portion of a native roof rack, as illustrated in FIG. 26. FIG. 1 illustrates two mounting systems 100, wherein each includes an elongate rail 110 removably attached to lateral cross-members of a roof rack of a vehicle. Elongate rails 110 are held in place by shackles, or clamps 112, that are formed from two metallic plates that surround the rail 110 and native cross-member, including bores that accommodate bolts that can be tightened to urge the plates toward each other and hold the rails 110 in place. While a simple universal clamp 112 is illustrated, it will be appreciated that any suitable clamp can be used. As further illustrated in FIG. 1, relative directions of length, or lengthwise "L", width, or lateral dimension "W" and height "H" are also illustrated. The longitudinal elongate rail 110 can act as or otherwise define a longitudinal track to permit the lateral rail to slide along the longitudinal direction.

As further illustrated in FIG. 1, each system 100 includes a bracket assembly (120, 130, 140) that receives an article to be mounted.

Figure 2:
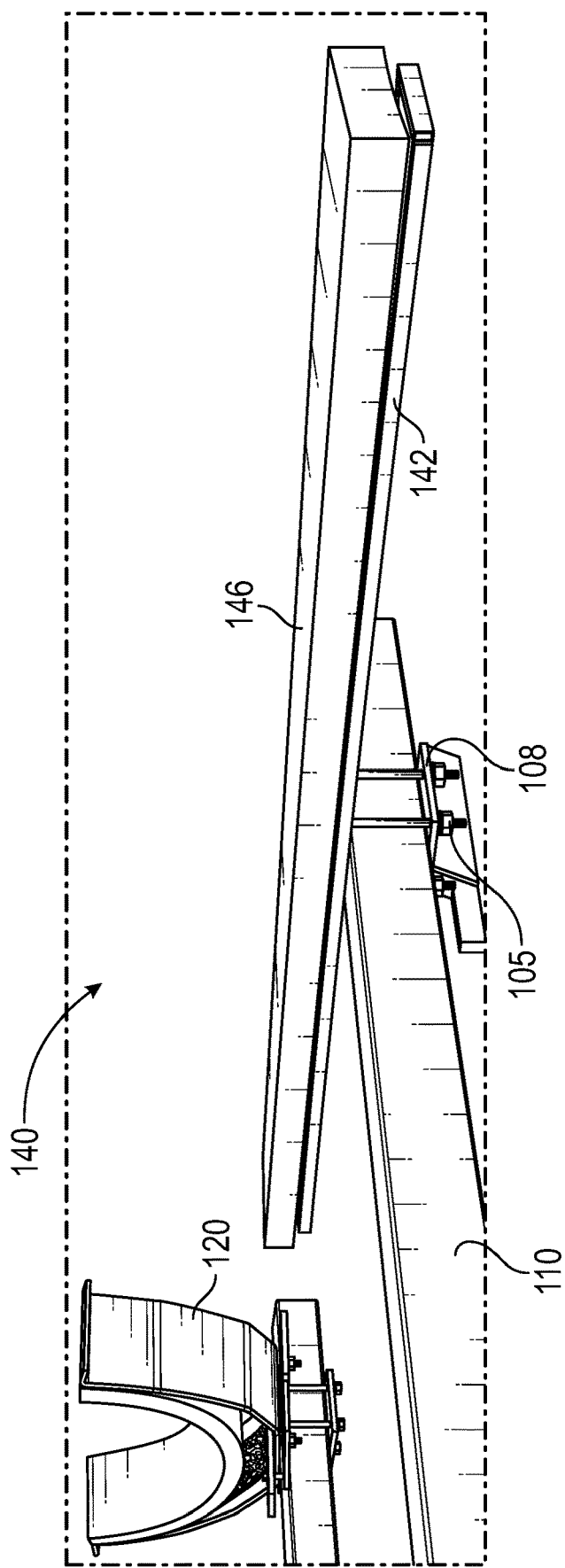
FIG. 2 is an enlarged view of a portion of the embodiments of FIG. 1.

With reference to FIG. 2, bracket assembly 140 is flat and simple in design and is configured to receive a paddleboard thereon (and held in place, for example, by a strap and/or elastic cord). Bracket assembly 140 includes a flat structural plate 142 made, for example, from aluminum bar stock or other suitable material. Plate 142 can be provided with a strip of padding 146 made, for example, of foam rubber. Padding 146 may be permanently attached (e.g., via adhesive) or removably attached to plate 142 via hook and loop fastener, snaps, mechanical fasteners, or the like. Padding can be removably attached to an inner surface of the upwardly extending bracket(s), the lateral rail, or a strap or sling that is used to hold the article in place within the system. The pad(s) can be shaped and positioned to conformably receive a portion of the article being stored or transported in any of the disclosed embodiments.

Brackets 120, 130 are more complex and adjustable and are configured to at least partially surround an article being secured to the system 100. Each of brackets 120, 130 includes a lateral rail (122, 132) that is in turn attached to elongate rail 110 by a clamp arrangement that includes a lower plate 108 having (e.g., four) holes bored therethrough to accommodate fasteners that also pass through the lateral rail. While a clamping arrangement can be used to hold lateral rails 122, 132 in place with respect to elongate rails 110, other arrangements can be used as desired. For example, lateral rails 122, 132 could include a sleeve attached thereto that slides over the elongate rail or may be bolt-able or otherwise directly attachable to the elongate rail 110 by way of threaded fasteners or the like.

Figure 3:
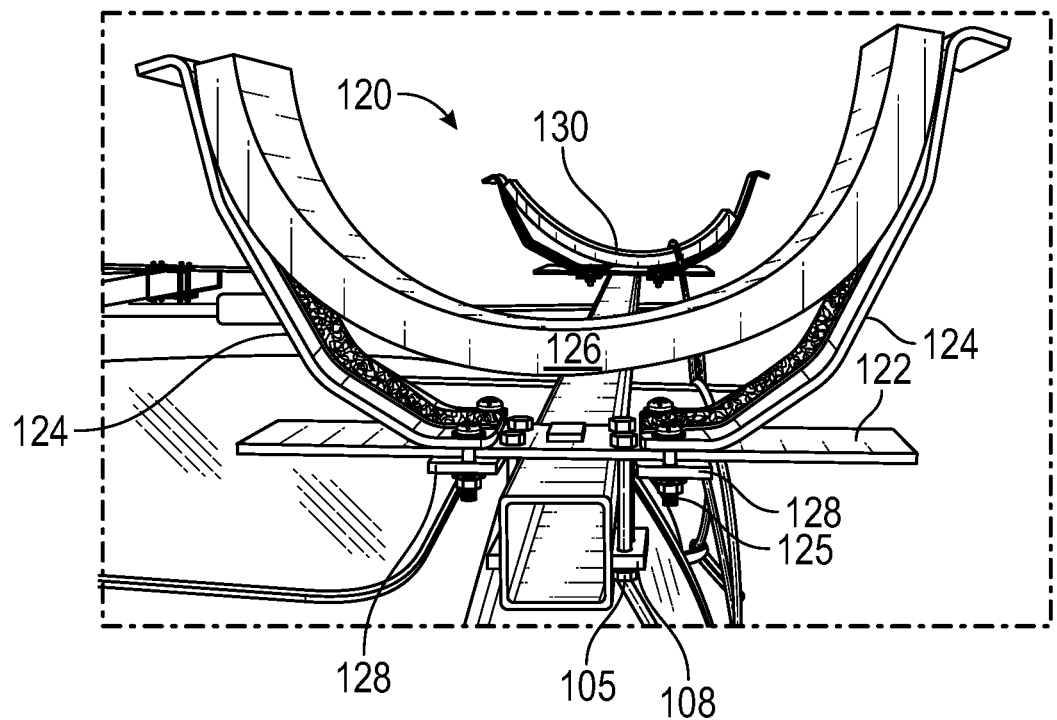
FIG. 3 is an end view of an embodiment in accordance with the present disclosure.
Figure 4:
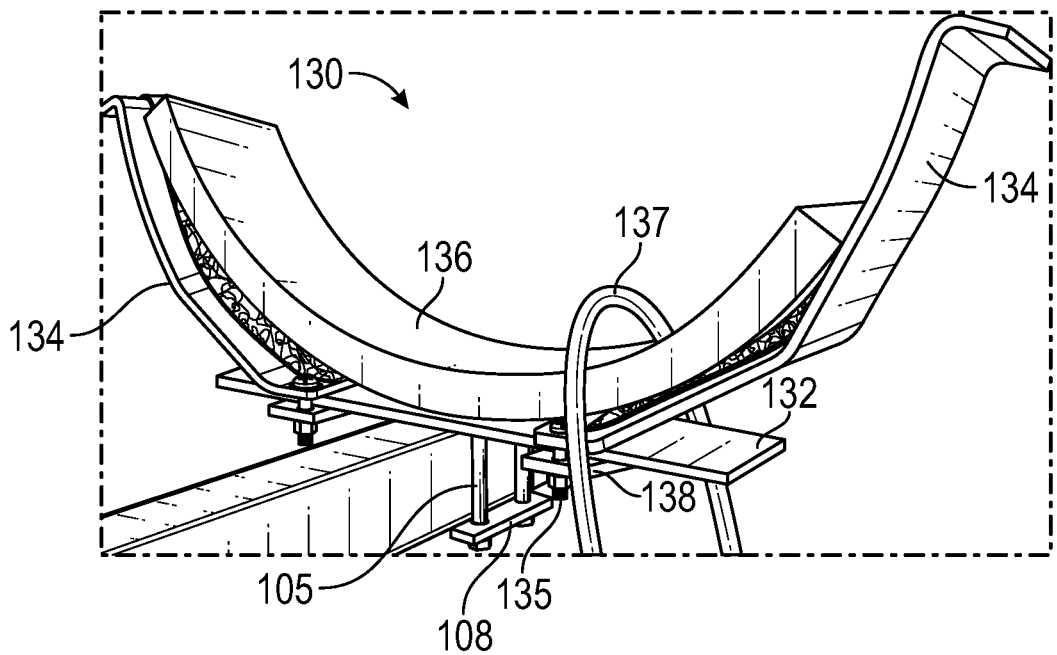
FIG. 4 is an end view of a further embodiment in accordance with the present disclosure.

With reference to FIGS. 3 and 4, brackets 120, 130 are illustrated. Each of brackets 120, 130 include a lateral rail 122, 132 in the form of a flat plate that is bolted to the elongate rail 110, as described above. Each of brackets 120, 130 further includes a pair of upwardly extending brackets, or arms 124, 134. Bracket 124 includes a first, lower horizontal portion that transitions into a first angled planar portion that transitions into second and third angled portions, and finally terminates in a bent over flange. Bracket 134 also starts with a horizontal flat segment, and includes two angled panels that then terminates in a bent over flange. Alternatively, each of brackets can be formed by one or more curved segments that may be of constant or changing radius. Brackets 124, 134 are attached to rails 122, 132 by frictional fit attributable to a clamp formed by plates 128, 138 including bore holes that receive bolts 125, 135 therethrough. Bolts 125, 135 are received by bore holes defined through brackets 124, 134. The width of plates 128, 138 can be the same as that of brackets 124, 134, as illustrated. Thus, the lateral rail 122, 132 can be narrower in width than the upwardly extending bracket(s) 124, 134 to permit lengthwise edges of the brackets 124, 134 to overlap and pass beyond lengthwise edges of the lateral rail 122, 132 to permit the components to be slid over one another. However, it will be appreciated that the system can be configured such that the lateral rail 122, 132 can be wider than or the same width as the upwardly extending bracket(s) 124, 134. As illustrated, the lateral rail 122, 132 can act as or otherwise define a lateral track to permit the upwardly extending bracket(s) 124, 134 to slide along the lateral direction so they can move away from or toward one another along the lateral rail. While the lateral rails 122, 132 can be orthogonally oriented with respect to the longitudinal elongate rail 110, they can alternatively be obliquely oriented with respect to rail 110, if desired. The lateral rail 122, 132 can be configured to be mounted at a plurality of longitudinal positions along the longitudinal rail 110.

Figure 5:
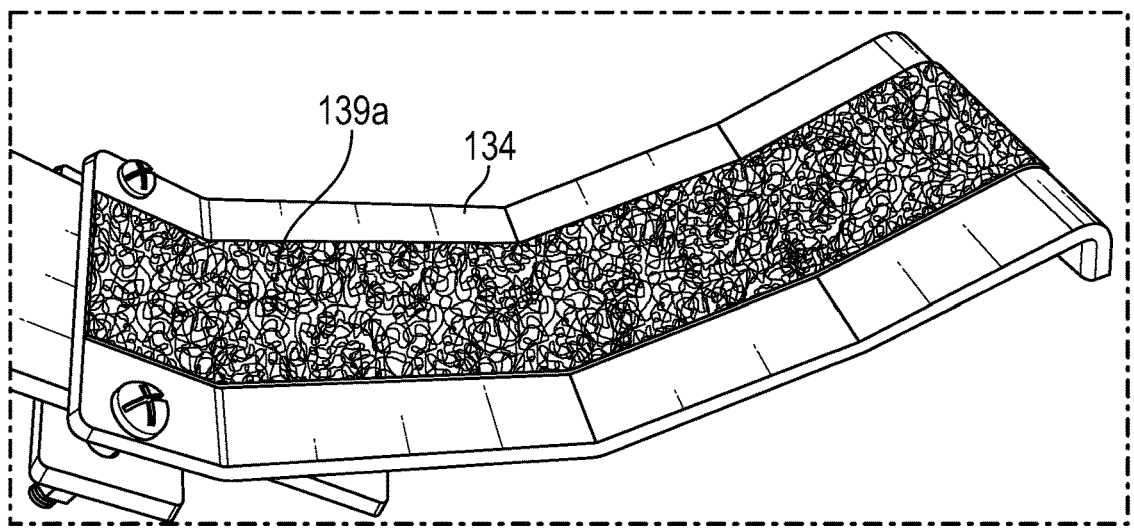
FIG. 5 is a perspective view of an upwardly extending bracket in accordance with the present disclosure.
Figure 6:
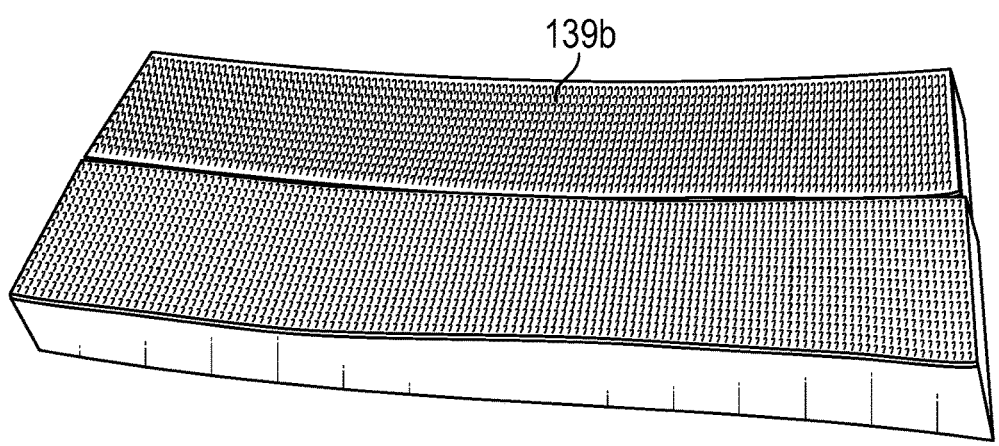
FIG. 6 is a bottom view of a pad in accordance with the present disclosure including a fastener attached thereto.
Figure 7:
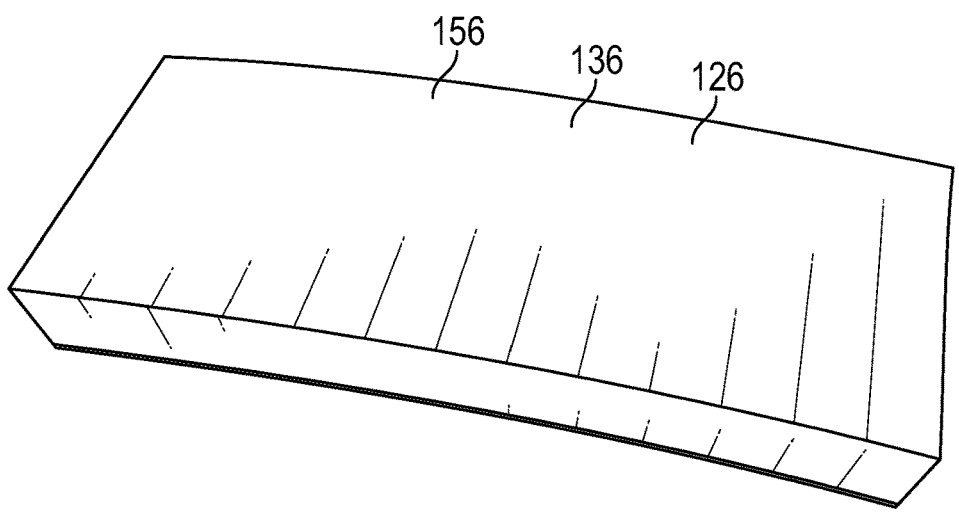
FIG. 7 is a top view of the pad of FIG. 6.

As further illustrated in FIGS. 3 and 4, padding 126, 136 can be (and preferably is) included in the bracket 120, 130 to help cushion any article being transported using system 100. As illustrated, padding 126, 136 is an elongate compliant material, such as foam rubber or the like. As illustrated, the padding 126, 136 may be rectangularly-shaped and have a rectangular cross section so as to match the general dimensions of the bracket 120. Padding 126, 136 can be permanently attached to the brackets 120, 130. Preferably, and with reference to FIGS. 5, 6 and 7, padding 126, 136 is removably attached to the brackets 124, 134, and if desired, to the lateral rail 122, 132 by snaps or hook and loop fastener 139a (FIG. 5) and 139b (FIG. 6), for example. The padding can follow the surface of the bracket such as with bracket 130 such that the padding is generally in contact with the structure of the bracket 130 along its length as illustrated in FIG. 4. Alternatively, as illustrated in FIG. 3, the padding 126 can be connected at its ends to the upper portions, for example, of brackets 124 and be suspended therebetween to form a cradle that can conform to the shape of whatever article is being carried, such as a rounded crew shell hull. An elastic cord 137 or other strapping can be used to hold an article in place in cradle 120, 130 by placing the article in the cradle and looping the elastic cord or strap over the article and under the upper bent flanged ends of each of the brackets 124, 134.

Figure 8:
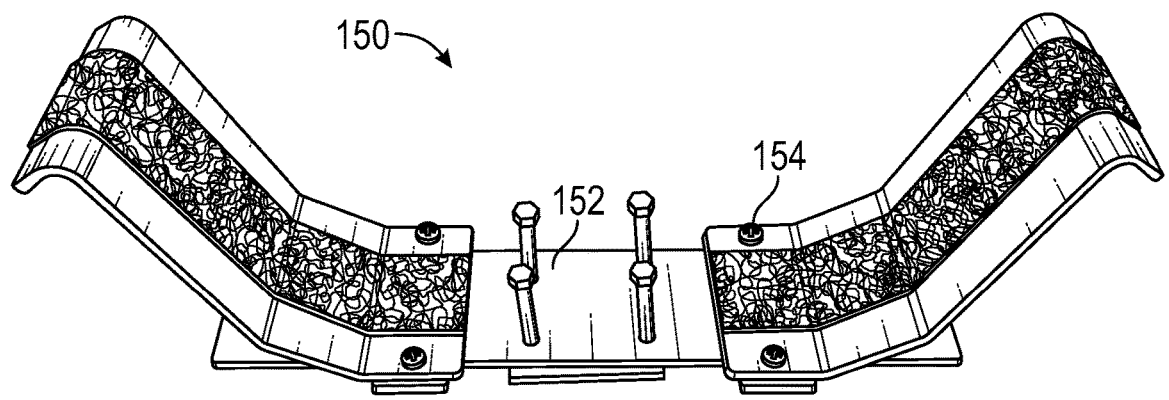
FIG. 8 is a perspective view of a portion of a mounting system in accordance with the present disclosure.
Figure 9:
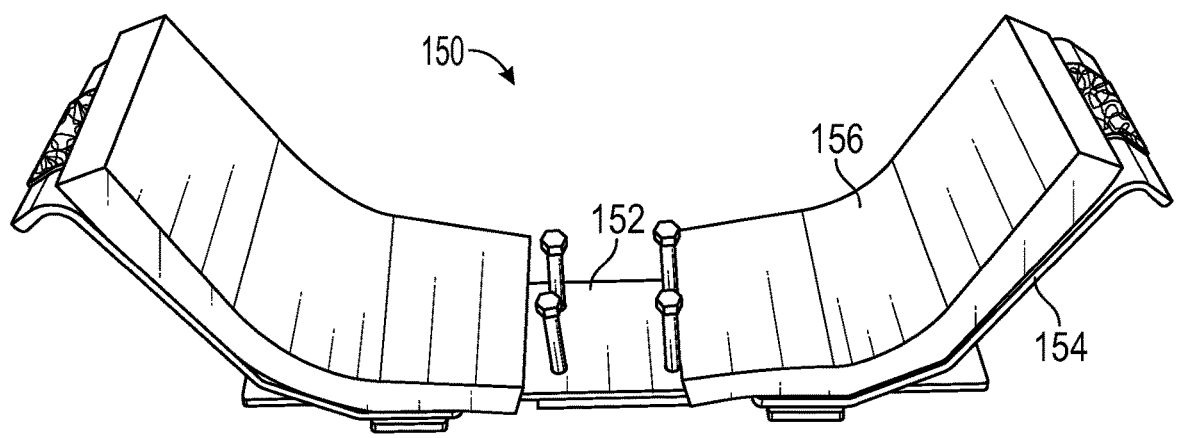
FIG. 9 is a perspective view of the embodiment of FIG. 8 having padding removably attached thereto.

FIG. 8 illustrates a further embodiment of a bracket assembly 150 that includes a linear lateral rail 152 similar to rails 122, 132 and brackets 154 that include a first, lower flat portion that abuts rail 152, which transitions into two flat angled portions and terminates in a bent over flange. FIG. 9 illustrates bracket 150 having pads 156 removably attached thereto by way of hook and loop fastener.

Figure 10:
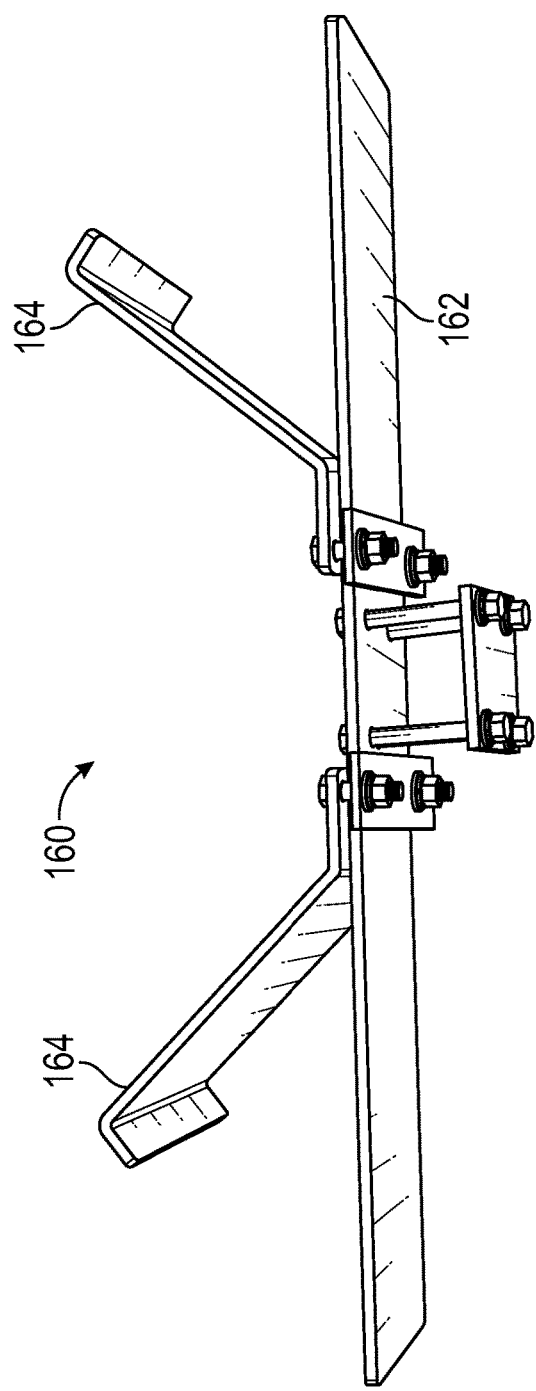
FIG. 10 is a bottom perspective view of a further embodiment of a mounting assembly in accordance with the present disclosure.
Figure 11:
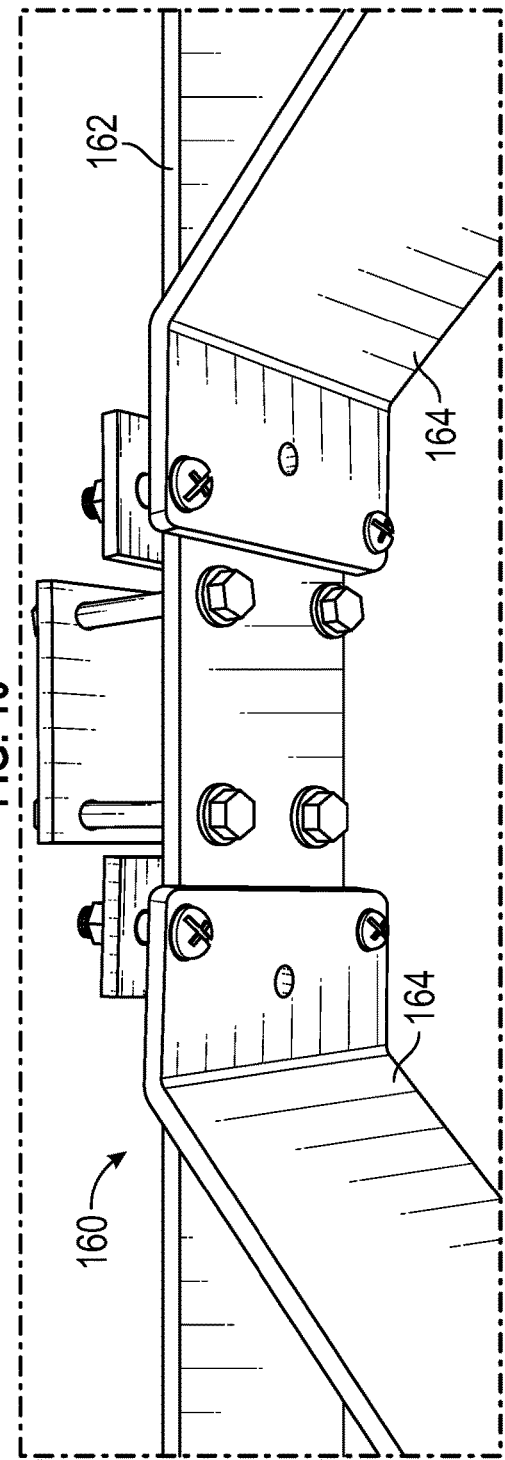
FIG. 11 is an enlarged top perspective view of a portion of the embodiment of FIG. 10.

FIGS. 10 and 11 illustrate a further embodiment of bracket assembly 160 that in turn includes a linear lateral rail 162 that includes a clamp for attaching the lateral rail 162 to elongate rail 110. Assembly 160 further includes angled upwardly extending brackets 164. Each of brackets 164 includes a flat lower horizontal portion that is clamped to the lateral rail 162, a second angled portion (that may be straight or curved) that terminates in a bent over flange.

Figure 12:
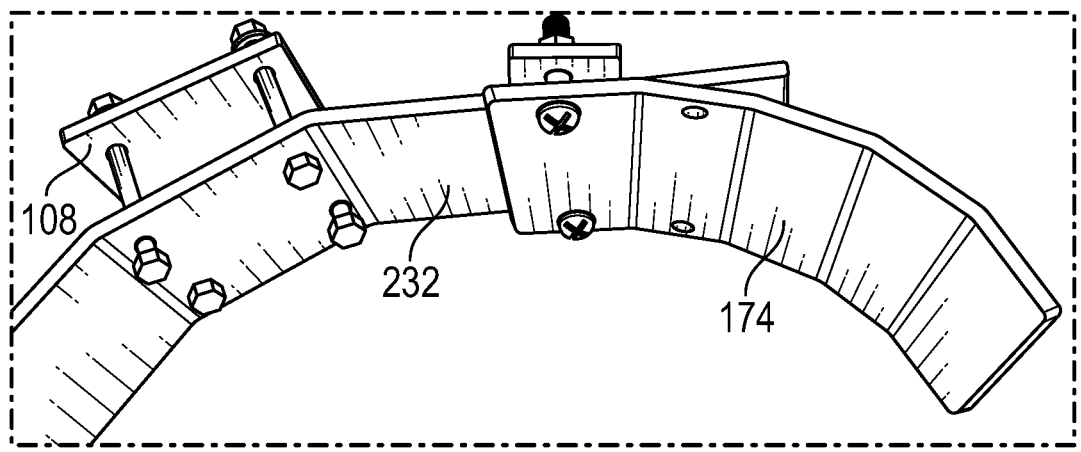
FIG. 12 is a top perspective view of a further embodiment of a mounting assembly in accordance with the present disclosure.
Figure 13:
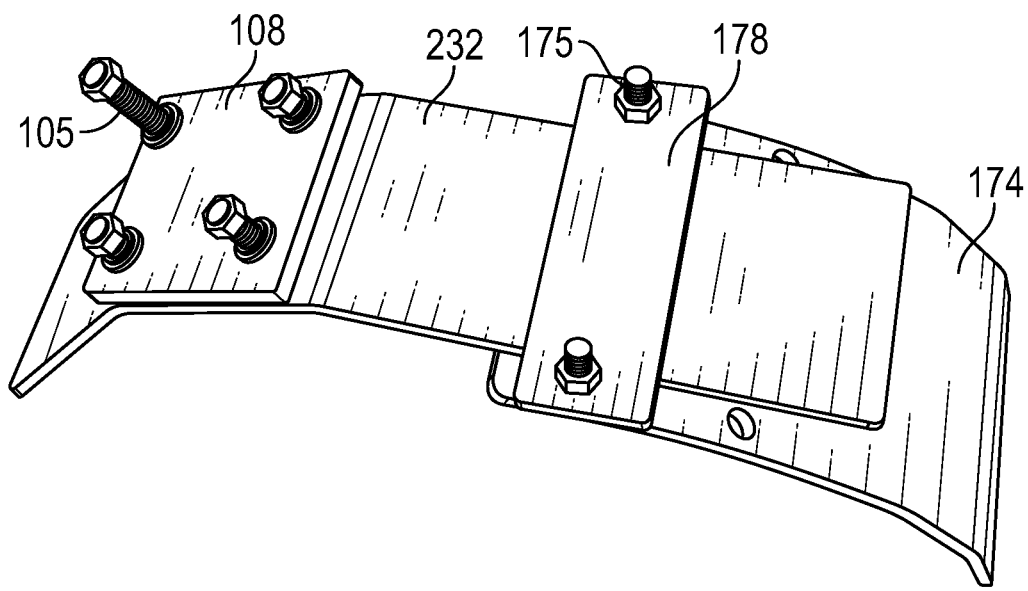
FIG. 13 is an enlarged bottom perspective view of a portion of the embodiment of FIG. 12.

FIG. 12 is a top perspective view of a further embodiment of a mounting assembly 170 in accordance with the present disclosure. FIG. 13 is an enlarged bottom perspective view of a portion of the embodiment 170 of FIG. 12. As illustrated, assembly 170 includes a lateral rail 232 that includes angled wing portions rather than being straight. Alternatively, rail 232 could include gently curved wings. Brackets 174 (or any other such bracket disclosed herein) is bolted to rail 232 in a fashion similar to bracket assemblies 120, 130 using a clamping arrangement. Bracket 174 includes a lower horizontal portion that contacts rail 232, and four progressively angled portions that terminate in a tip rather than a bent over flange as with the previous embodiments. In further implementations, all embodiments of brackets (124, 134, 154, 164) can omit the outer bent over flange to facilitate use of a strap attachment system discussed in further detail below with reference to FIGS. 19-26.

Figure 14:
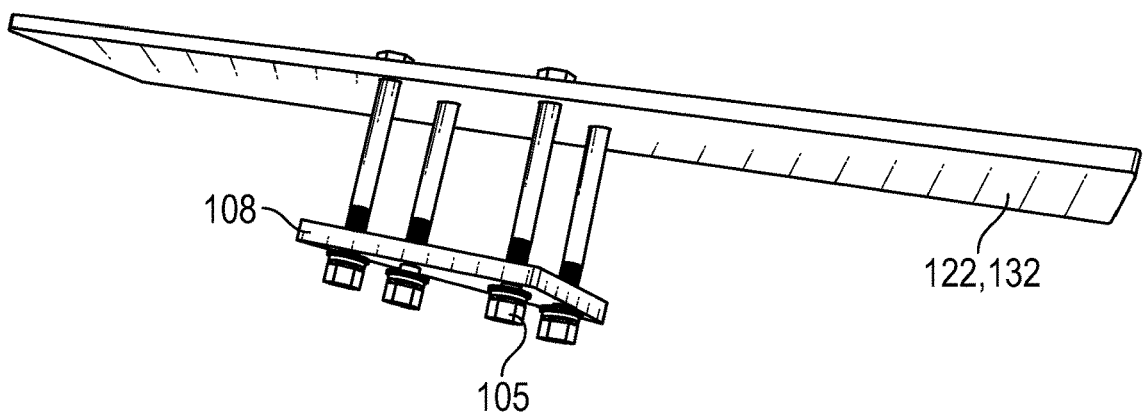
FIG. 14 is a bottom perspective view of a first embodiment of a lateral rail in accordance with the present disclosure coupled to a mounting bracket.
Figure 15:
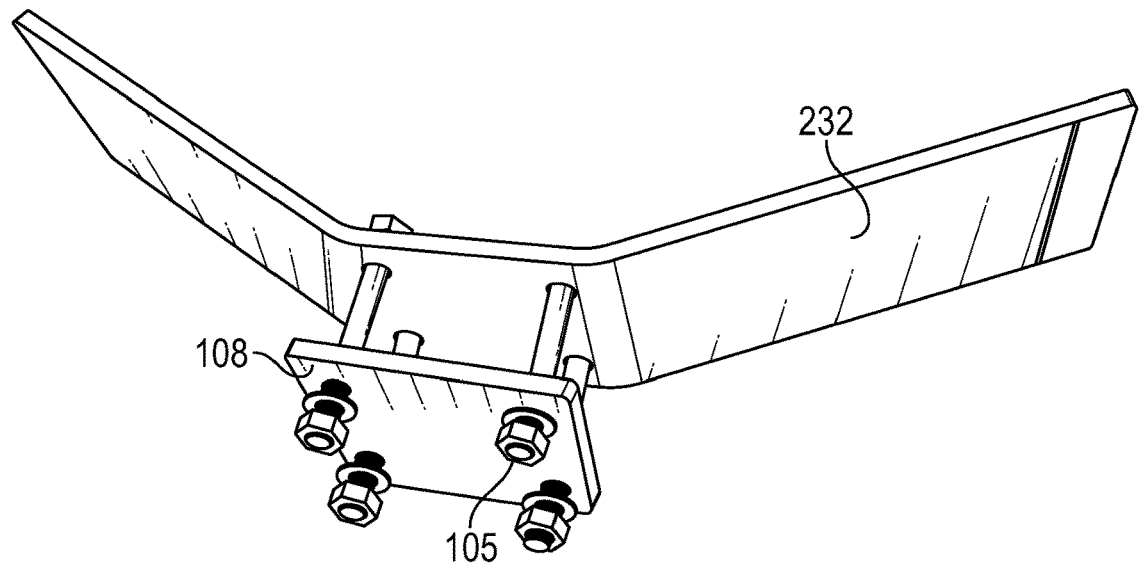
FIG. 15 is a bottom perspective view of a second embodiment of a lateral rail in accordance with the present disclosure coupled to a mounting bracket.
Figure 16:
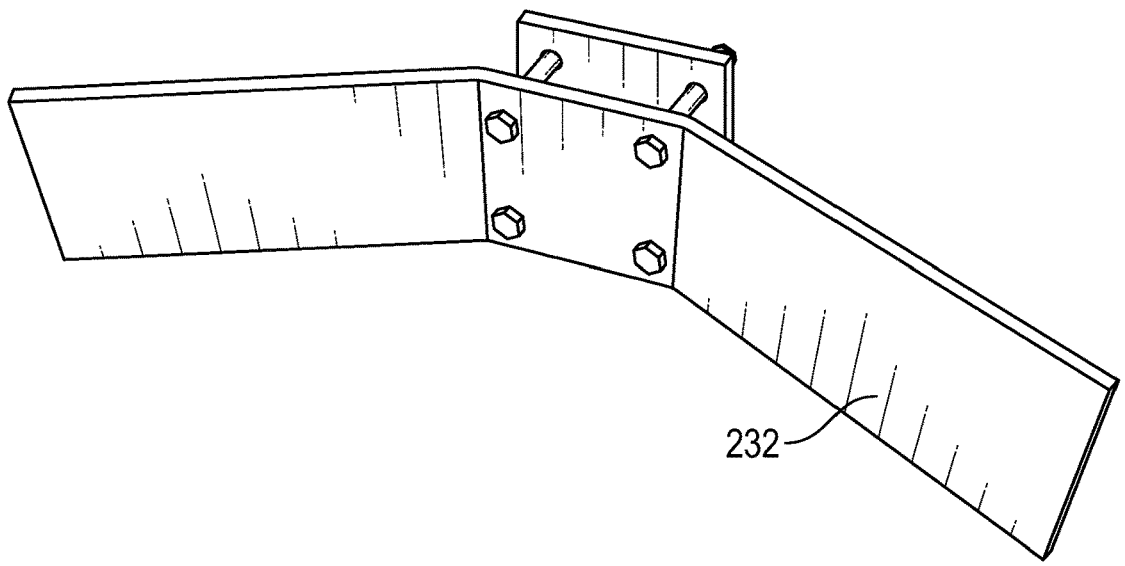
FIG. 16 is a top perspective view of the embodiment of FIG. 15.
Figure 17:
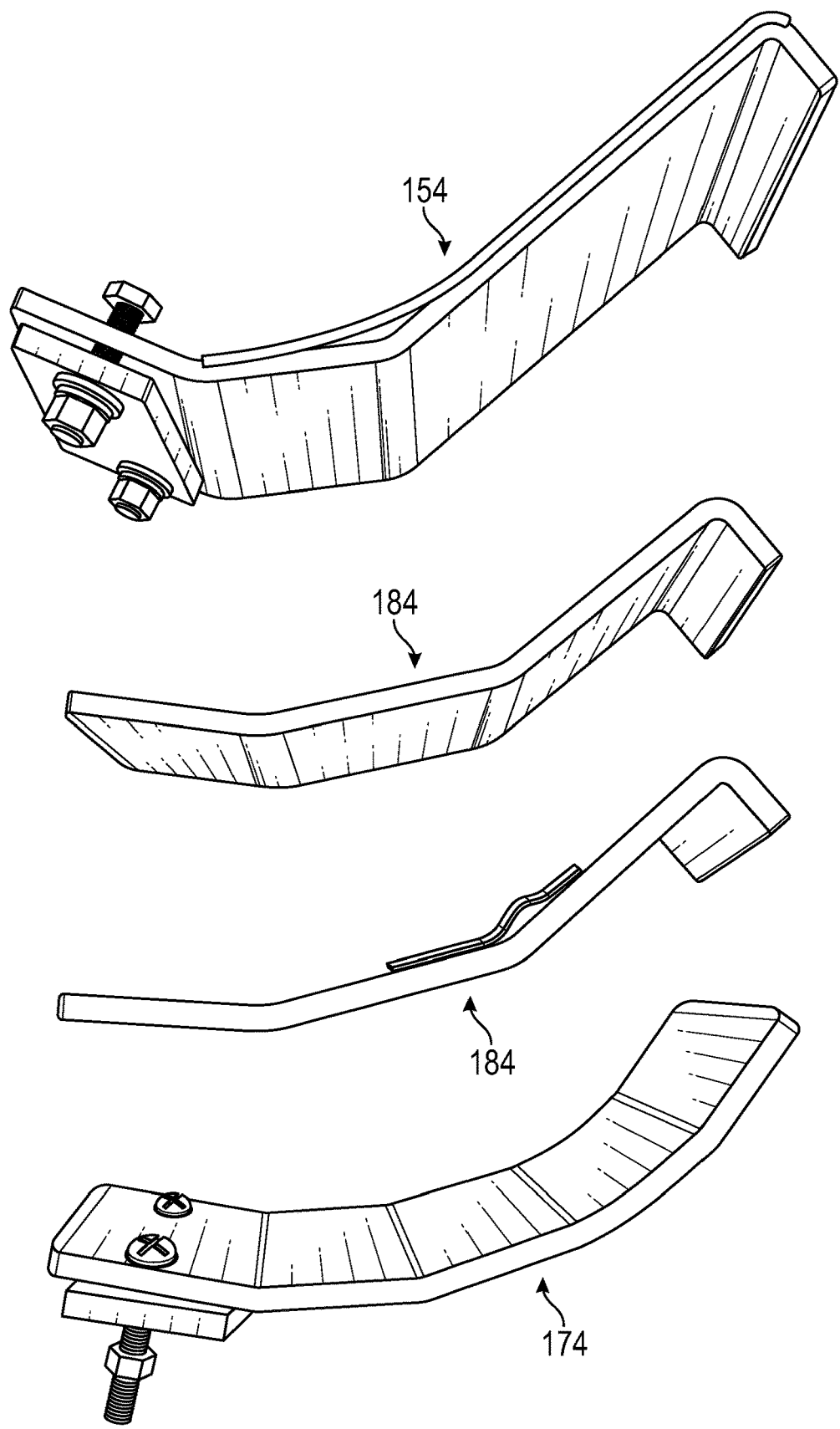
FIG. 17 is a perspective view of different embodiments of various embodiments of upwardly extending brackets in accordance with the present disclosure.

Lateral rail 132 can be attached to elongate rail 110 in a similar manner as previous embodiments using the illustrated clamping arrangement. Lateral rail 232 is illustrated in further detail in FIGS. 15 and 16, while the linear rail 122, 132 is illustrated in FIG. 14. FIG. 17 illustrates the various embodiments of upwardly extending brackets 154, 174 and 184, wherein the latter includes a lower portion that is attached to the lateral rail, and two shallowly bent portions terminating in a bent over flange for holding an elastic cord or belt in place to help retain an article in the bracket.

FIGS. 18 to 26 present a further embodiment of a bracket 190 in accordance with the disclosure. This embodiment omits the bent over flanges of the upwardly extending brackets of previous embodiments and instead utilizes brackets 192 at the upper ends (or any other location) along brackets 190 for the routing of elastic cords, or for holding sling webbing in place, discussed in further detail below.

Figure 18:
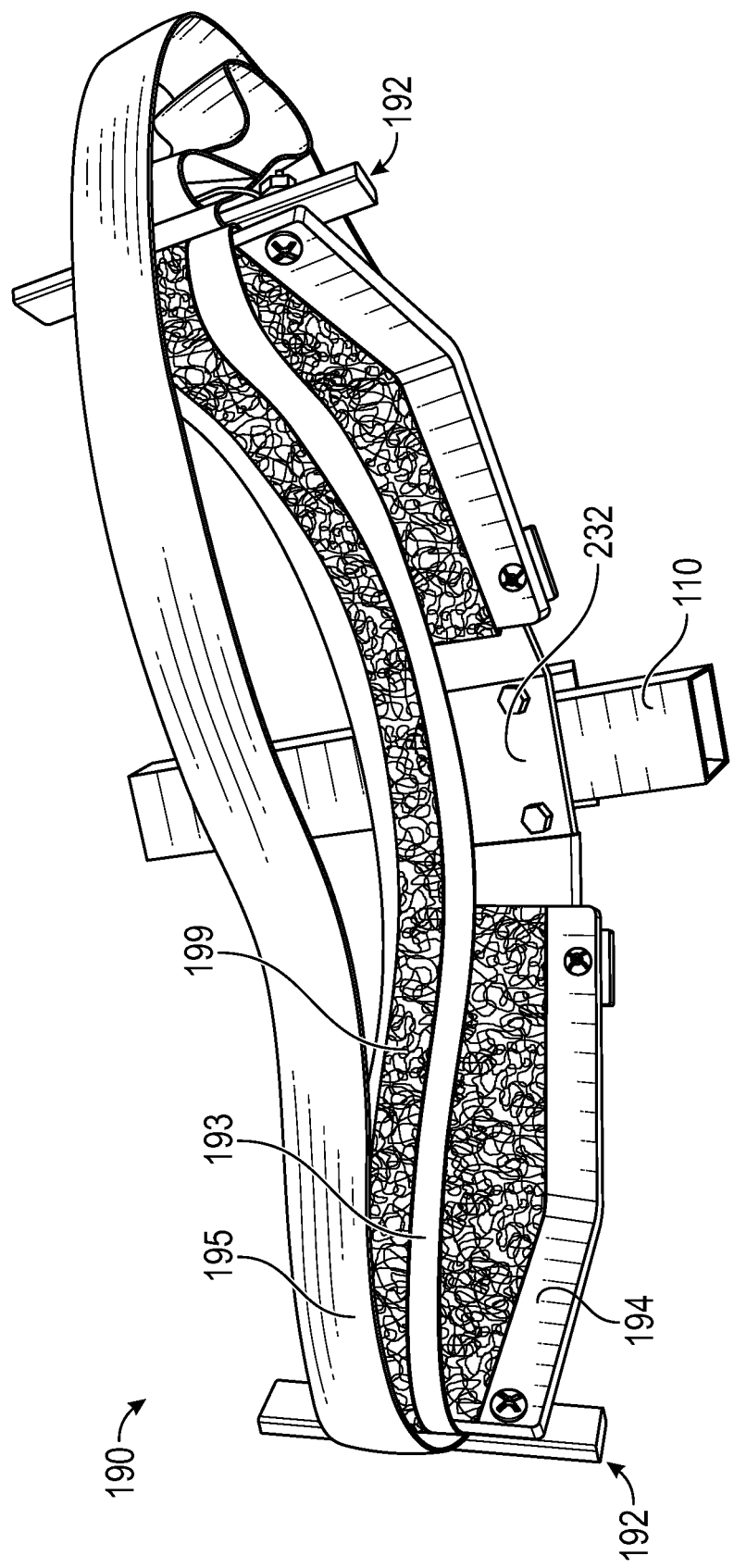
FIG. 18 is a perspective view of a further embodiment of a mounting system in accordance with the present disclosure including modified upwardly extending brackets, webbing and a circumferential strap in accordance with the present disclosure.
Figure 19:
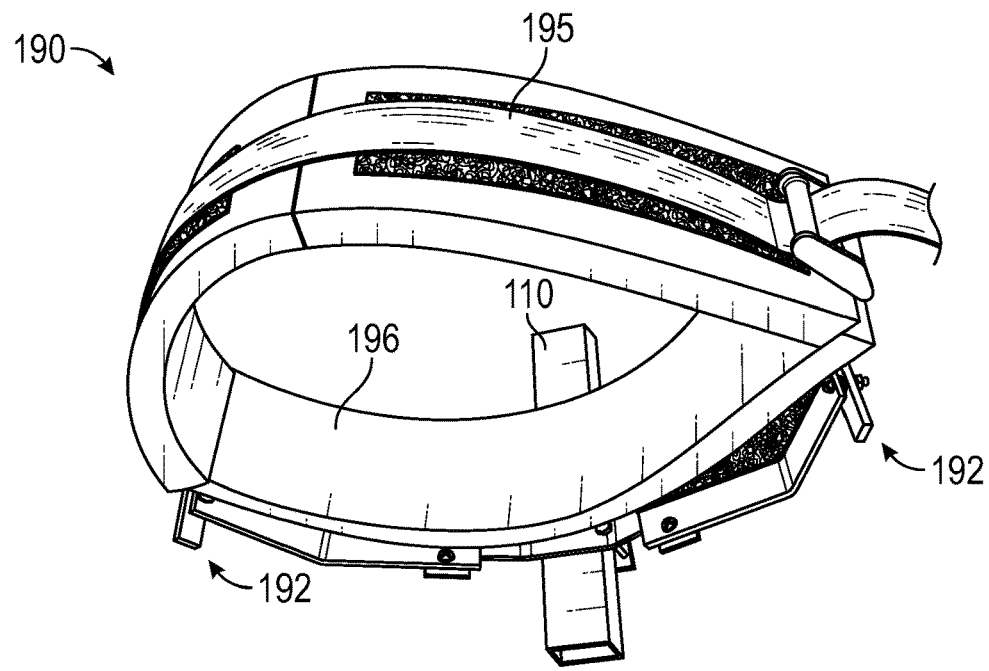
FIG. 19 is a perspective view of the mounting system of FIG. 18 with removable padding installed.

With reference to FIG. 18, bracket 190 is illustrated without padding installed. A strip of webbing 193 is added that is suspended across the expanse of the bracket arms 194, held in place by way of a frictional fit between an outer upper surface of bracket 194, and an inner face of bracket 192 that are bolted together, holding webbing 193 tightly in place. Webbing 193 can include a strip of hook and loop fastener as illustrated (or other fastener) to receive padding 196 (FIG. 19) that can be provided with complementary hook and loop fastener, snaps, or the like. A strap 195 is also routed between the clamping portions of brackets 194 and 192, as well as under brackets 194 (and lateral rail 232, if desired) so as to fully surround the bracket 190 as well as any article placed inside of the bracket 190. An inner surface of the upper portion of strap 195 can be provided with hook and loop fastener (not shown) in order to provide a securement surface for padding 196, as illustrated in FIG. 19. FIG. 18 illustrates the underlying structure of bracket 190 and FIG. 19 shows the structure with the padding 196 in place. If desired, and as illustrated, the padding 196 can surround the opening defined by the bracket 190, and any article placed in the bracket, which can be important for expensive watercraft such as crew rowing shells.

Figure 20:
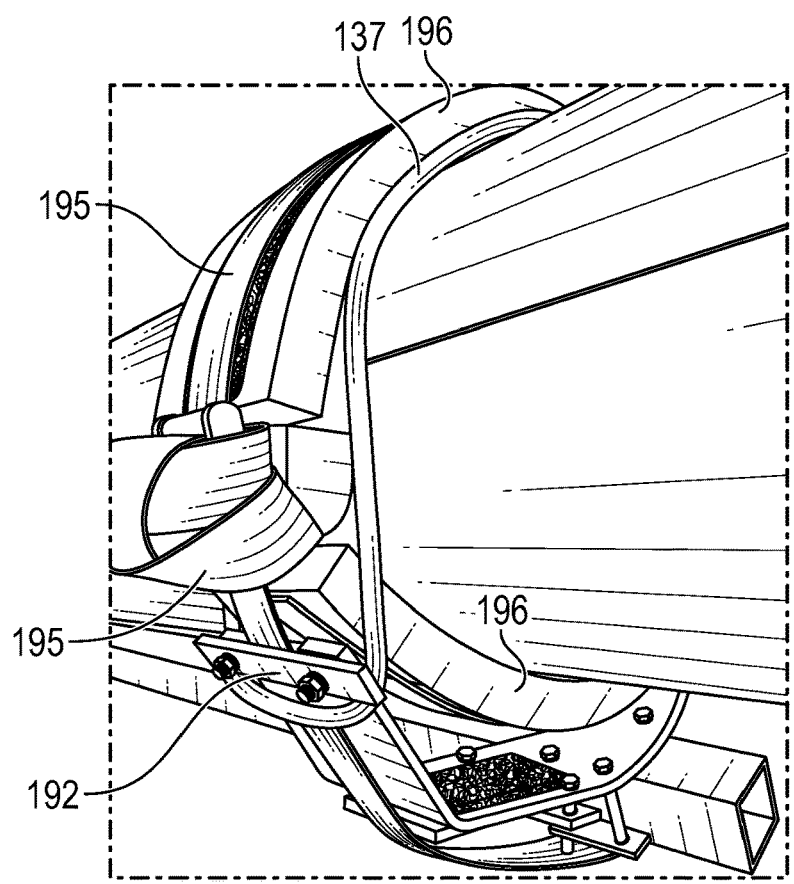
FIG. 20 is a perspective view of a first end portion of the mounting system of FIG. 19 with a personal water craft mounted therein, illustrating the relative placement of components.
Figure 21:
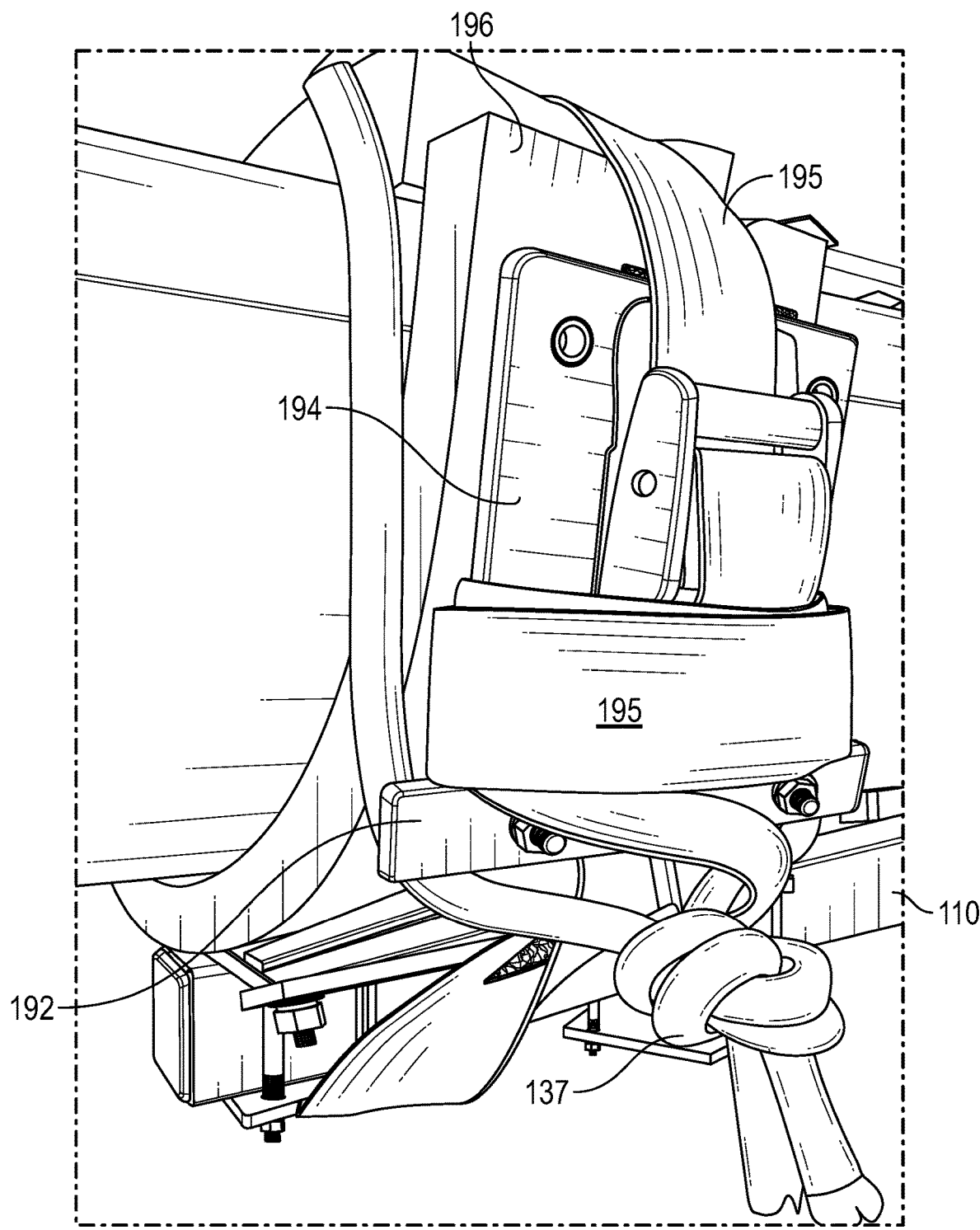
FIG. 21 is a perspective view of a second end portion of the mounting system of FIG. 19 with a personal water craft mounted therein, illustrating the relative placement of components.
Figure 22:
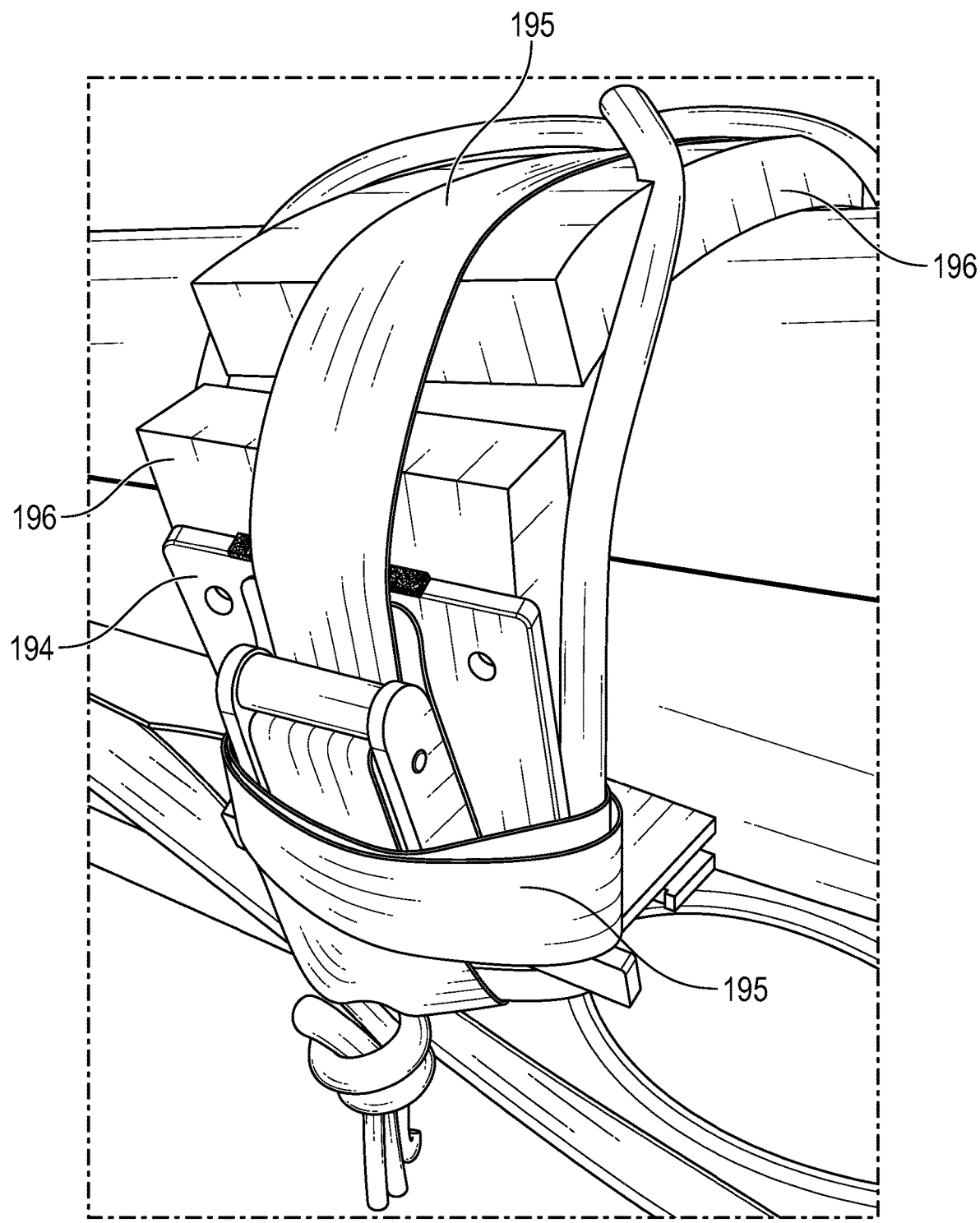
FIG. 22 is a top perspective view of the second end portion of the mounting system of FIG. 19 showing the relative placement of components.

FIG. 20 is a perspective view of a first end portion of the mounting system of FIG. 19 including bracket assembly 190 with a personal water craft mounted therein, illustrating the relative placement of components. FIG. 21 and FIG. 22 are a bottom perspective view and a top perspective view of a second end portion of the mounting system of FIG. 19 with a personal water craft mounted therein, illustrating the relative placement of components on the other side of the boat.

As illustrated in FIG. 20, an article such as a personal watercraft is held in place by the components of the bracket assembly on the roof of a vehicle via attachment to a roof rack. The article rests on padding 196 that in turn rests on webbing 193 that is supported by two upright brackets 194 as described above. A clamp is formed by cooperation between an upper edge of one of the brackets 194 and a plate 192 that are bolted together, which sandwich and compress webbing 193 that forms a sling under the personal watercraft to support a lower portion of the padding, as well as a lower portion of strap 195 that runs underneath the brackets 194, along the top of or underneath lateral rail 232 and terminates at an upper end at two buckles, one on each side of the bracket assembly. An elastic cord 137 formed into a loop can be directed under the ends of the plate 192 that extends beyond the width of the plate that forms bracket 194 on each side of the bracket assembly (see also FIG. 21). Padding 196 is in direct contact with the surface of the article around substantially its entire extent in order to provide maximum cushioning protection. FIG. 21 shows the same components on the other side of the bracket assembly. FIG. 22 shows the other side of the bracket assembly from a higher angle, more clearly showing padding passing over the top of the article.

Figure 23:
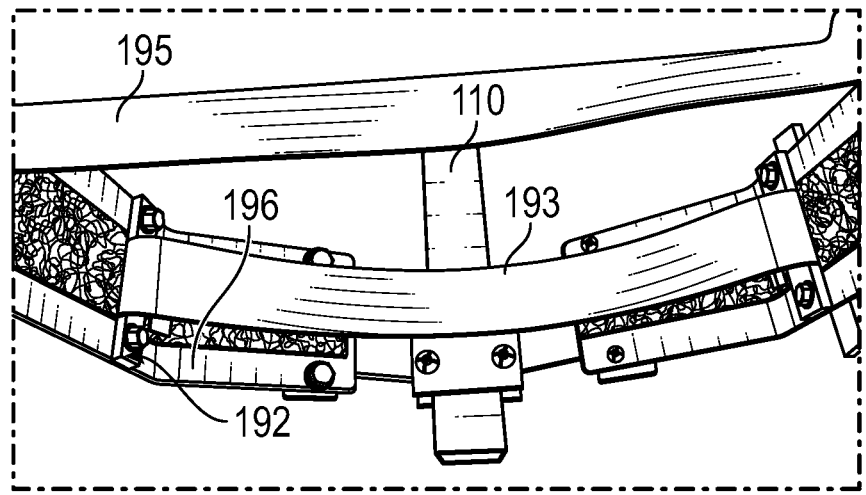
FIG. 23 is a further perspective of the mounting system in accordance with the present disclosure including modified upwardly extending brackets, webbing and a circumferential strap in accordance with the present disclosure.
Figure 24:
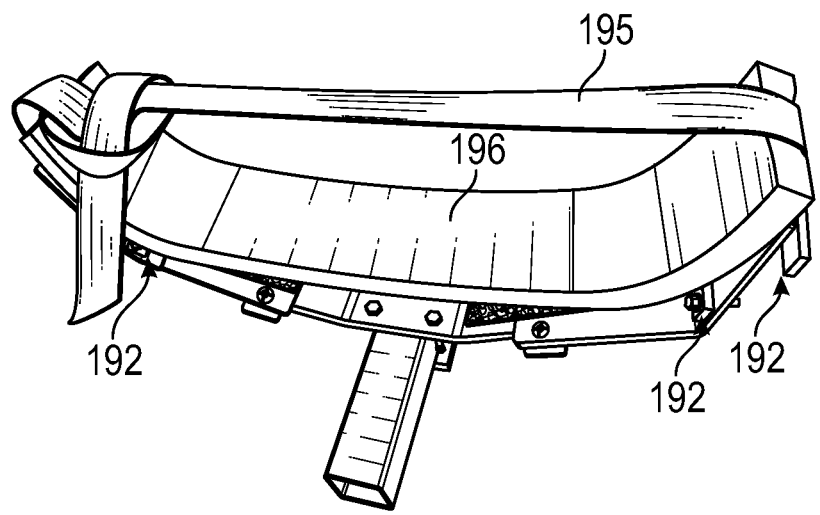
FIG. 24 is a perspective view of the mounting system of FIG. 23 with removable padding installed.
Figure 25:
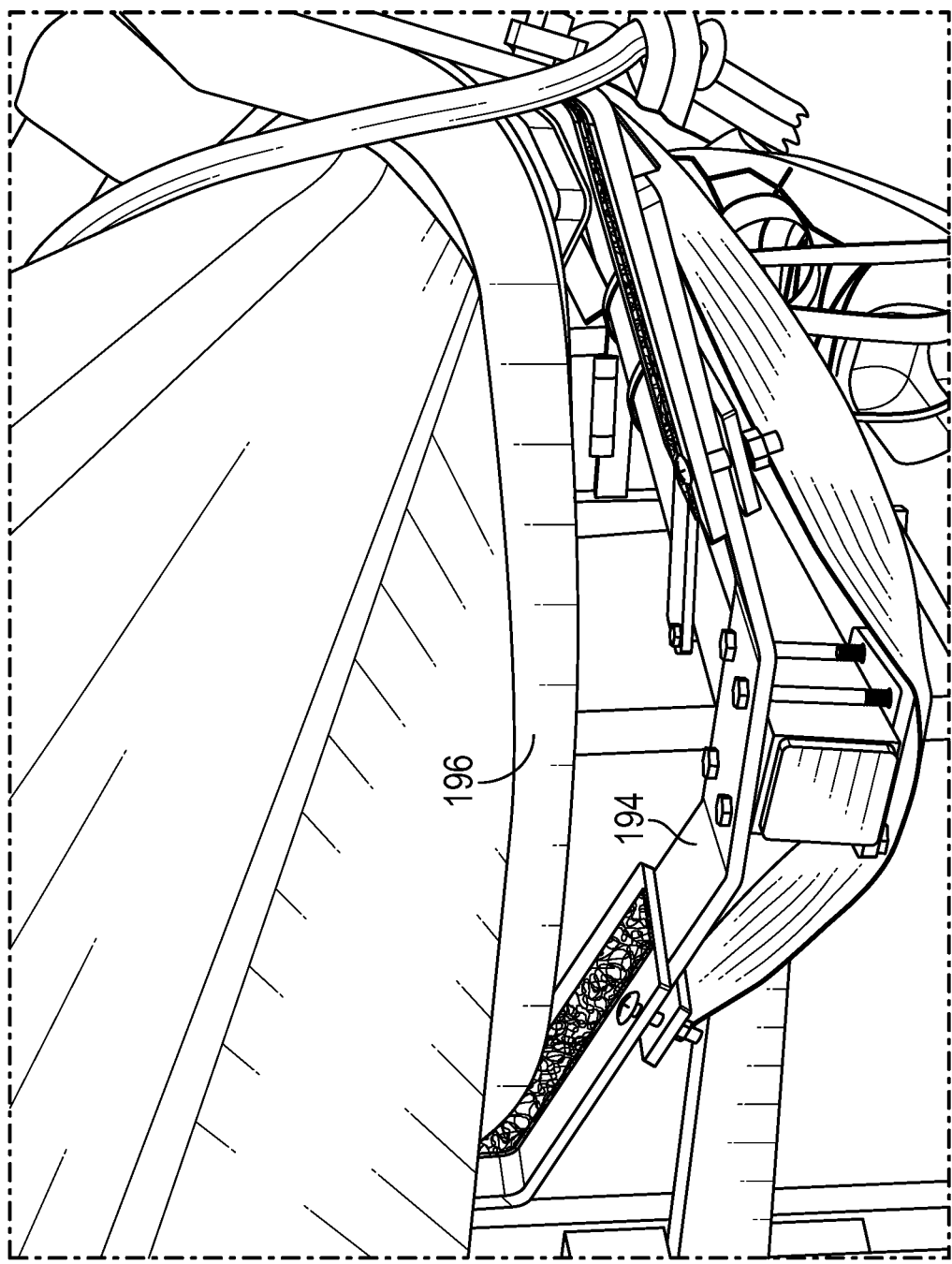
FIG. 25 is a bottom perspective view of the mounting system of FIG. 24 with a personal water craft mounted therein, illustrating the relative placement of components.

FIG. 23 is a variation on the previously described embodiment. While the overall structure and components used are the same, an additional set of plates 192 is added at a lower location along the brackets 194 near a bend about halfway along the extent of brackets 194 to form a second pair of clamps. Plates 192 are illustrated as being the same extent in length as the width of brackets 194, but plates may be longer or shorter as desired. Plates 192 are bolted to the inside of the brackets 194 at each end, and webbing 193 passes between the bolts of each bracket to form a lower sling that is suitable for supporting a flat object such as the top of a kayak or other personal watercraft, for example, as illustrated in FIG. 25. FIG. 23 shows the bracket assembly without padding (wherein hook and loop fastener is not illustrated as being added to webbing 193) and FIG. 24 shows the addition of padding 196 that is attached at either end of the padding to hook and loop fastener that is in turn attached to the inner faces of brackets 194. FIG. 25 shows a lower portion of the strap being directed beneath elongate rail 110 and underneath the upper clamps of the bracket assembly. Also present in FIG. 25 are the strap 195 and optional elastic cord 137 to hold the article secure in the supporting bracket assembly.

FIG. 26 illustrates the bracket assemblies 190 described above coupled to native lateral rails 332 of an existing roof rack system. The lateral rails 232 of the brackets 190 are thus parallel to the native rails 332. It will be appreciated that the adjustable bracket assemblies (e.g., 120, 130, 150, 160, 170, 180, 190) can be coupled or suitably modified to be coupled to existing roof racks or other storage or transport racks to enhance versatility.

While previous embodiments have been directed to bracket systems that are adjustable and removable from an elongate support, the present disclosure also provides V-brackets or U-brackets that are not adjustable, and may or may not be easily removed from an elongate support (e.g., 110).

Figure 27:
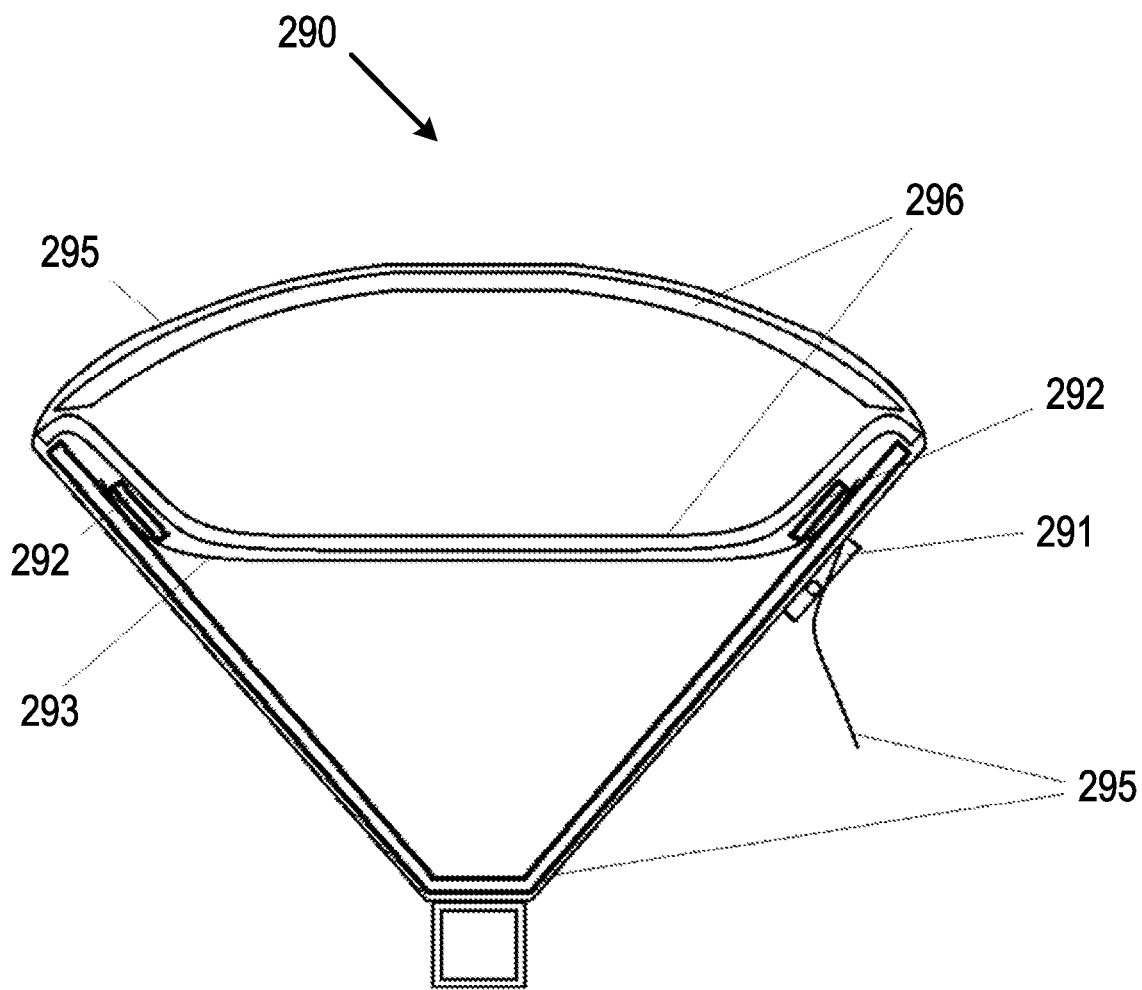
FIG. 27 is an end view schematic of a further embodiment of a mounting system in accordance with the present disclosure.

For purposes of illustration, and not limitation, FIG. 27 illustrates an end view of yet a further embodiment of a bracket assembly 290 in accordance with the present disclosure that includes a non-adjustable structural V-bracket bolted to an elongate rail (e.g., 110) that includes strap and clamping features very similar to embodiment 190. While the upwardly extending arms of the bracket are not adjustable, they include one or more plates 292 bolted thereto in a fashion similar to plates 192 being bolted to plates 194. Plates 292 may be longer, shorter or the same extent of the depth/width of the plates forming the V-bracket to form clamps to hold webbing 293 in place, wherein webbing 293 forms a compliant, flexible lower support for padding 296. A strap 295 can be directed around a lower face of the V-bracket and over or under the lower elongate rail (e.g., 110) and terminate in a free end that passes through a buckle 291. Alternatively, a buckle can be provided at each side as with the previously described embodiment. An upper section of padding 296 can be attached to a lower face of strap 295. Padding 296 can be permanently or removably attached as desired as with the previously described embodiments. If desired, the supporting webbing 293 can be removed, and the pad 296 can be suspended to form a cradle by attaching each end thereof to one of the upper inner faces of the V-bracket.

Figure 28:
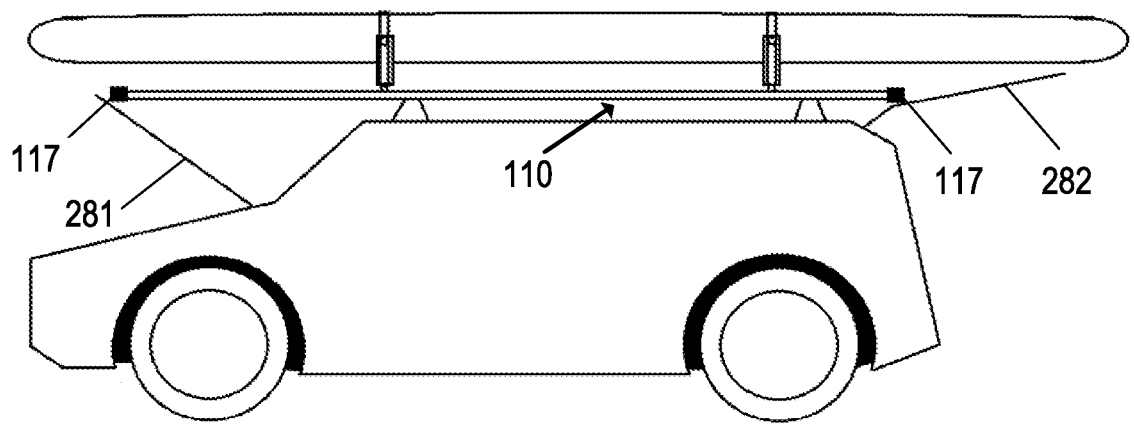
FIG. 28 is a side view of a vehicle having a mounting system in accordance with the present disclosure disposed on a top thereof.

FIG. 28 presents a side schematic view of a vehicle that includes a mounting system attached to a top thereof in accordance with the present disclosure. The hood 281 and rear hatch or trunk lid 282 may be opened without damage due to collision with the ends of elongate rail 110 by way of padded end caps 117 attached to the front and rear ends of the rail 110. Alternatively, the padding 117 can be attached to the bottom or under side of the rail 110 at any location along its length. The padding can be permanently attached, or detachable fasteners (e.g., snaps or hook and loop fastener) can be attached to each of the underside of the rail and the upper face of the pad to permit adjustable placement of the pad along the rail at a plurality of locations so any adjustments can be made on an as-needed basis. This is useful particularly if a user's hood, hatch or trunk opens in an area other than the bar ends.

In further implementations, the system can include one or more supplementary bracket(s) for coupling to one or more accessories on the article being transported, such as the outrigger on a canoe or one or more oars or paddles for personal watercraft. The supplementary bracket can be attached at a first end to the longitudinal elongate rail, and can include a second end for receiving the outrigger. The bracket can also be coupled to an upwardly extending bracket of the system or a lateral rail of the system, as described in further detail below.

Figure 29:
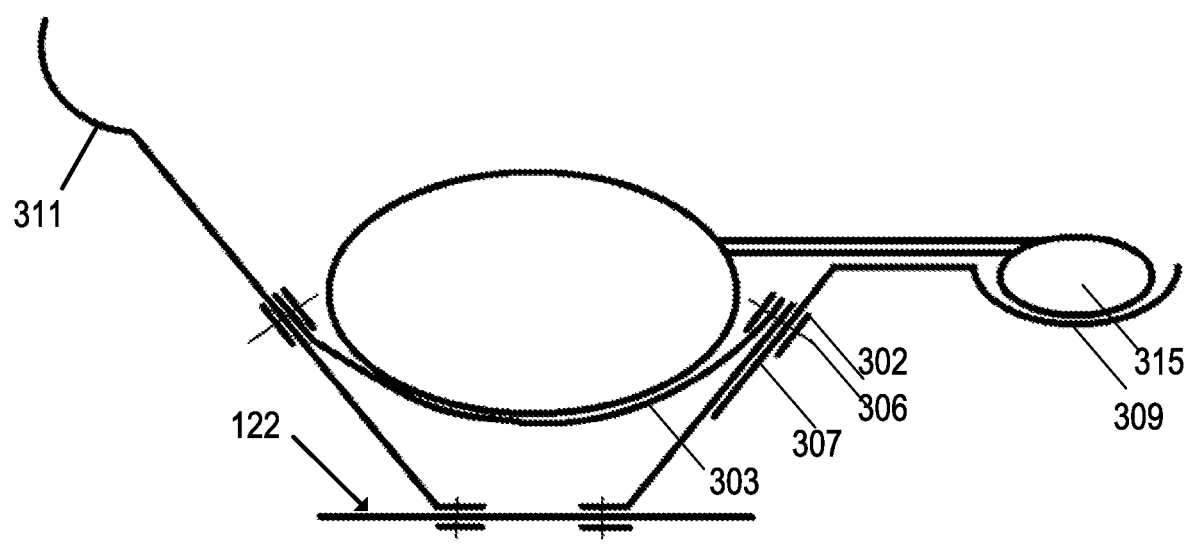
FIG. 29 is a schematic view of yet a further mounting system in accordance with the present disclosure.

For purposes of illustration and not limitation, FIG. 29 presents a further embodiment of a bracket assembly in accordance with the present disclosure. The system shares many similarities with preceding embodiments (e.g., 190, 290) in that it includes a lateral rail (e.g., 122) that is attached to adjustable upwardly extending brackets that form a V-shape and may be moved toward or away from each other and bolted in place. Clamp plates 302 may be provided, similar in configuration to clamp plates 192, 292 for bolting to each other and/or the v-brackets via nuts and bolts 306 or other suitable fasteners, for example, to hold supporting webbing 303 in place, or accessory arms, described in further detail below.

The embodiment of FIG. 29 further illustrates accessory arms 307 and 311 that can be held in place against the arms of the V-brackets via clamp plates 302, for example. Arm 311 includes a cradle at an outward end thereof that can be used to support an oar or other object that is lashed to it with an elastic cord. Similarly, arm 307 can include a cradle 309 at an end thereof for supporting an outrigger 315 for a canoe, or other article. Arms 307, 311 or variations thereof can additionally or alternatively be attached to the lateral rail 122 or the elongate rail (not shown) of the system.

The disclosure further includes methods of mounting an article to a storage location or the roof of a cart or vehicle such as a motor vehicle or a trailer. In some implementations, the method includes attaching a longitudinal elongate rail (e.g., 110) to a support, such as the roof rack of a vehicle. The longitudinal elongate rail traverses a longitudinal direction, such as parallel to a length of the vehicle. The method further includes attaching a lateral rail (e.g., 132, 232) to the elongate rail. The lateral rail can be orthogonally or obliquely oriented with respect to the longitudinal elongate rail. The lateral rail can be configured to be mounted at a plurality of longitudinal positions along the longitudinal rail. The method further includes attaching at least one upwardly extending bracket (e.g., 124, 134, 154, 164, etc.) to the lateral rail to form a concavity for receiving the article. The at least one upwardly extending bracket can be configured to be mounted at a plurality of lateral positions along the lateral rail. The method can further include mounting the article to the at least one upwardly extending bracket.

In some implementations, attaching the lateral rail to the elongate rail can include sliding the lateral rail along the elongate rail to a desired position, and affixing the lateral rail in place with respect to the elongate rail. Attaching the at least one bracket to the lateral rail can include sliding the at least one upwardly extending bracket along the lateral rail to a desired position and affixing the at least one upwardly extending bracket in place with respect to the lateral rail. The method can further include, for example, affixing a padded sling to the at least one upwardly extending bracket, the padded sling being configured for receiving a bottom surface of the article.

Figure 30:
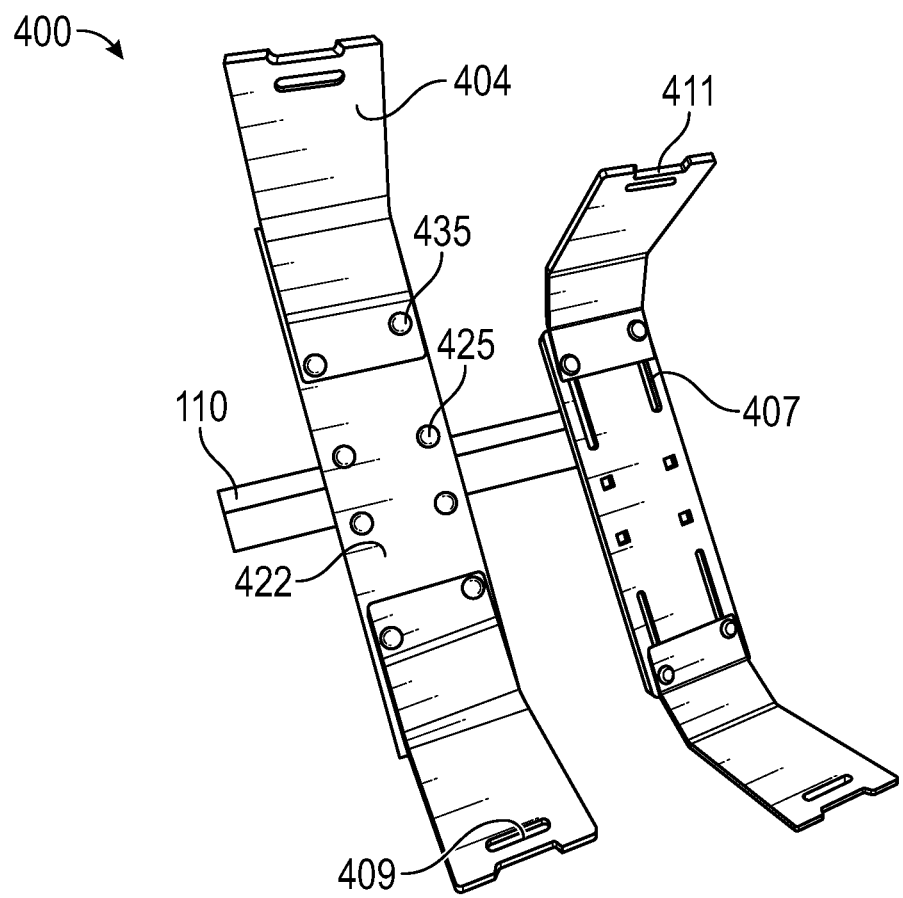
FIG. 30 is a top perspective view of a first mounting system coupled to a portion of an elongate rail, and a second mounting system prior to coupling to an elongate rail.

FIG. 30 is a top perspective view of a first mounting system 400 coupled to a portion of an elongate rail, and a second mounting system prior to coupling to an elongate rail. The components of the system of FIG. 30 are very similar in function and concept to the prior embodiments, but contain certain variations. In either instance the bracket system is clamped to an elongate rail 110 by a plurality of fasteners 425 that pass through a lower plate 408 below the rail (FIG. 32) and the base plate, or lateral rail, 422 that rests above the elongate rail 110. However, to facilitate lateral adjustment, the lateral rail 422 is provided with a plurality of elongate slots 407 through which fasteners 435 pass to couple the upward brackets 404 in place. The openings in rail 422 that receive fasteners 425 can be square in shape to receive a corresponding fastener that includes a square shank portion immediately below the head of the fastener 408, and the openings in brackets 404 that accommodate fasteners 435 can have a similar hole to accommodate a square portion of the shank below the head of the bolt. This permits utilization of easy to use wing nuts (FIG. 32) to hold those bolts in place without a need to use a wrench to assemble or loosen or tighten the system. Similarly, strap slots 409 are provided at the terminal upper ends of the brackets 404 to receive a strap therethrough, and partial slots 411 are defined at the tips of the brackets to prevent forward-backward movement of the straps. The slots 409, 411 can be used, for example, to receive a strap that can comprise all or a portion of a sling between the two upward brackets. It will be noted in FIG. 30 that the holes in the lower ends of the brackets 404 are laterally offset. This is not required, but is useful to help the handles on the wing nuts clear each other. The offset also helps hold the components aligned during adjustment.

Figure 31A:
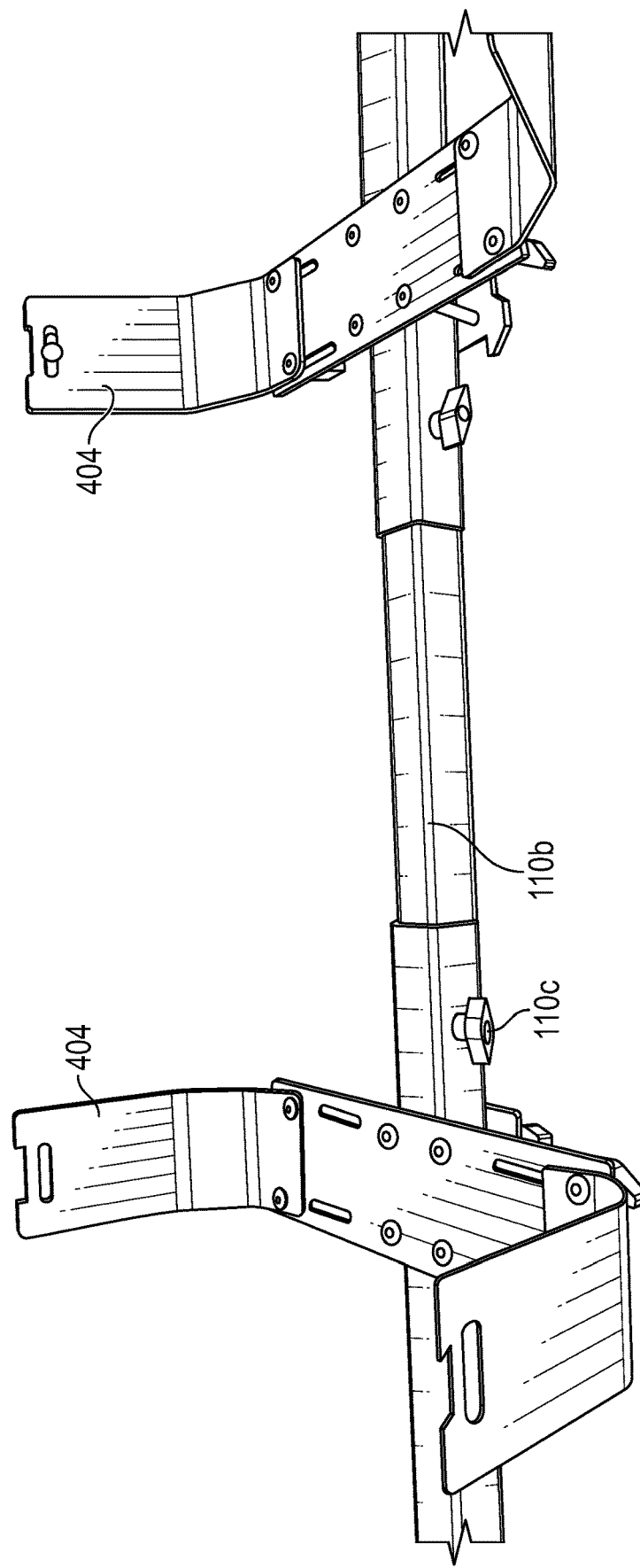
FIG. 31A is a perspective view of a mounting system including an elongate rail of an adjustable length with a pair of adjustable brackets mounted thereto.
Figure 31B:
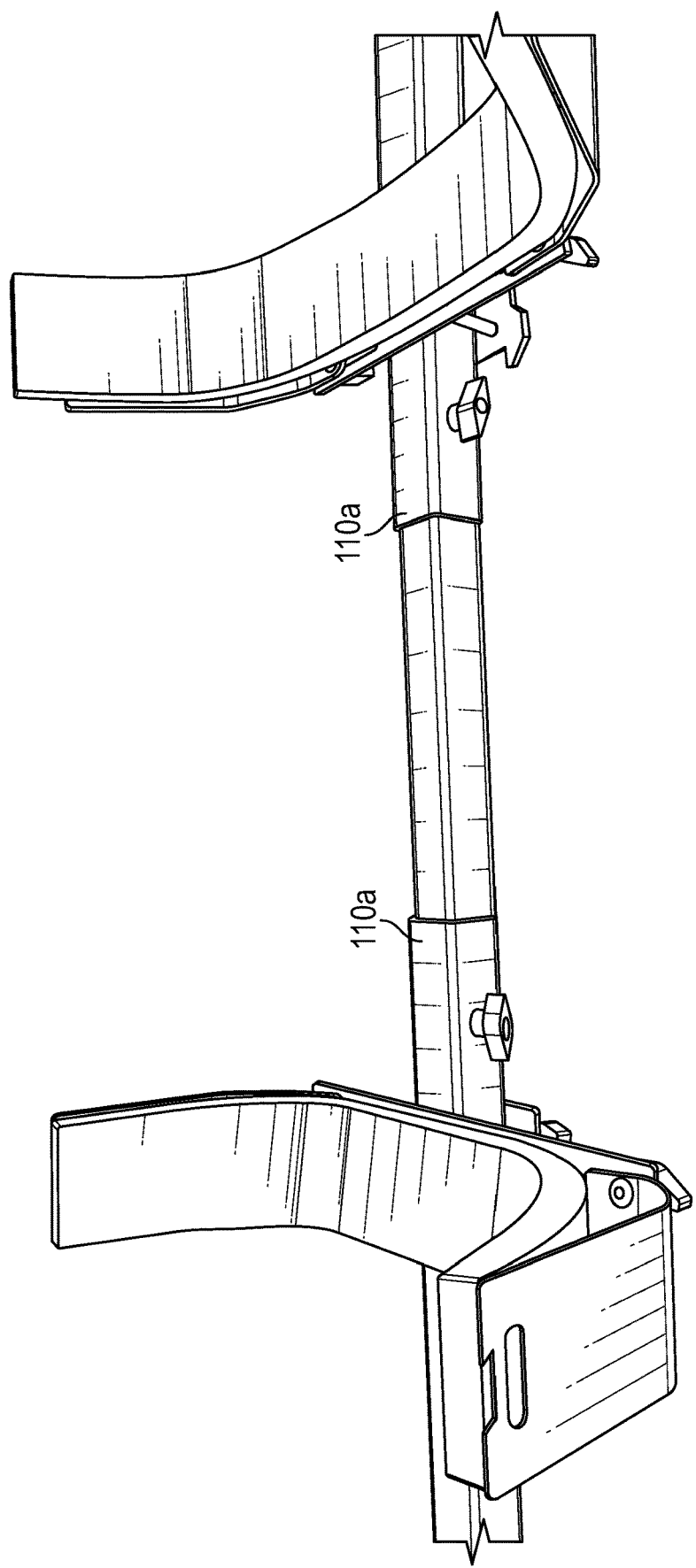
FIG. 31B is a perspective view of the same assembly after padding is applied to the brackets.

FIG. 31A is a perspective view of a mounting system including an elongate rail of an adjustable length with a pair of adjustable brackets mounted thereto. FIG. 31B is a perspective view of the same assembly after padding is applied to the brackets. The brackets are similar to those illustrated in FIG. 30. However, the rail 110 in this implementation is adjustable in length wherein rail portions 110a are provided that the brackets are clamped to in the form of hollow square tubing that are slidably received over a rectangular rail 110b of a slightly smaller dimension. Pins or bolts 110c are provided that are received through aligned holes in components 110a, 110b. Multiple holes can be provided along the length of component 110b to permit adjustment of the length between the brackets 404 at a plurality of discrete locations.

Figure 32:
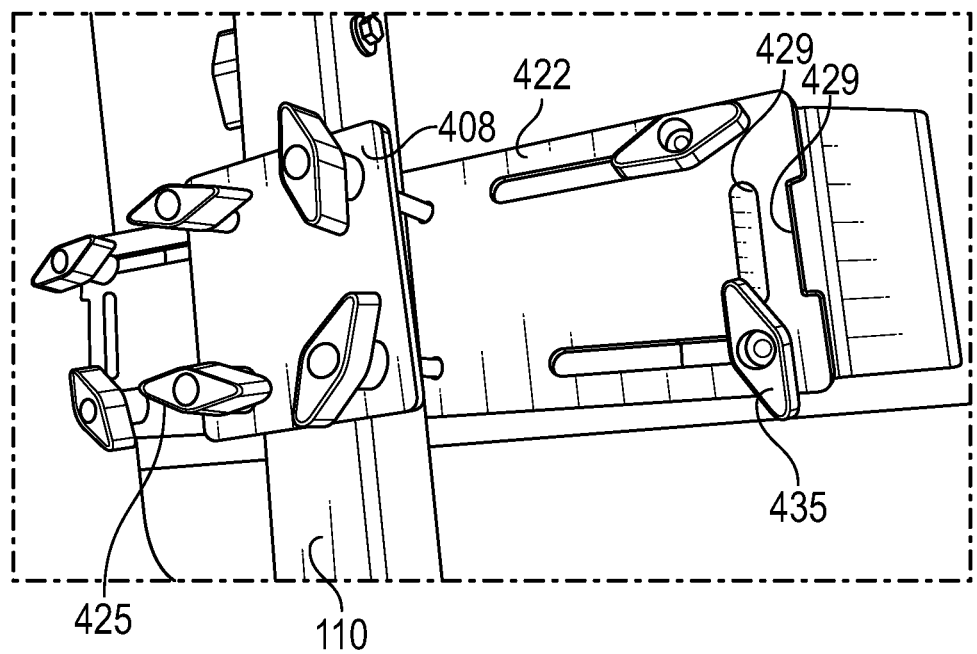
FIG. 32 is a perspective bottom view of a portion of the assembly depicted in FIG. 31A.

FIG. 32 is a perspective bottom view of a portion of the assembly depicted in FIG. 31A. Visible is plate 408 that can have round or square holes bored through its thickness to accommodate fasteners 425. It will be noted that rail 422 can have full and partial slots 429 formed at each end in the event that the upright brackets 404 are not needed, such as when transporting a flat article or an article of low profile.

Figure 33:
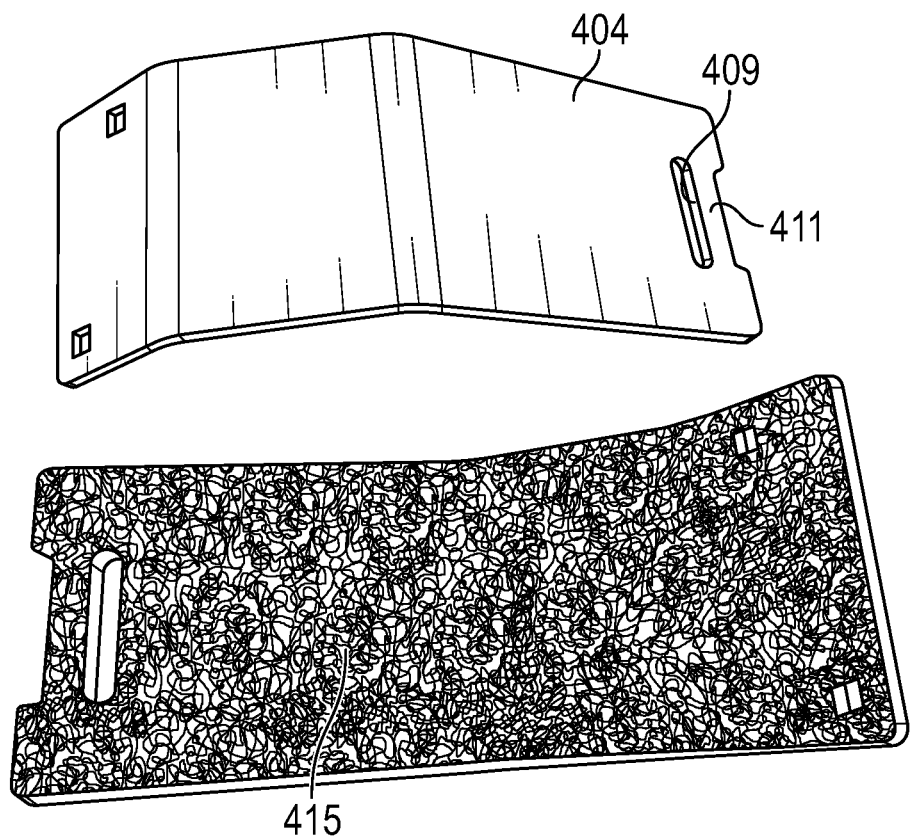
FIG. 33 is a view of an upright portion of a modular bracket and a padding section for the bracket.

FIG. 33 is a view of an upright portion of a modular bracket 404 and a padding section 415 for the bracket 404. As can be seen, the bracket is provided with square holes for receiving fasteners 435, and be provided with slots 409, 411 at its opposing end. Padding 415 is also sized and shaped to fit the contours of the bracket and includes corresponding openings to match the locations of slots and fastener holes. The padding 415 can be attached to the bracket 404 permanently or removably as described elsewhere herein.

Figure 34:
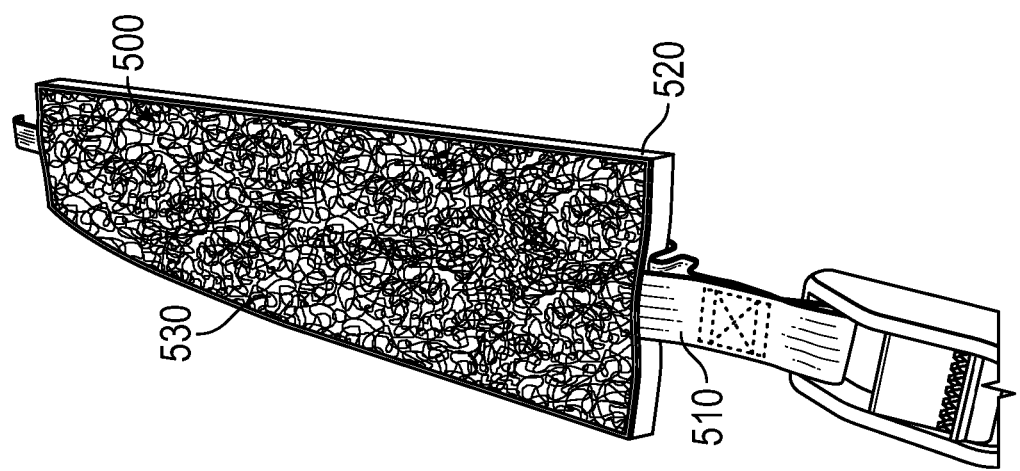
FIG. 34 is a perspective view of a padded strap wherein the strap is surrounded by padding.

FIG. 34 is a perspective view of a padded strap wherein the strap is surrounded by padding. The strap 500 includes a main strap component 510 formed from polyester webbing with a suitable buckle at each end. The padding includes a first layer 520 passing under the webbing, and a second layer 530 passing over the webbing, wherein the first layer 520 and second layer 530 can be adhered to each other permitting the strap to slide back and forth with respect to the padding, or the padding can also be attached to the webbing so as to prohibit relative sliding movement.

Figure 35:
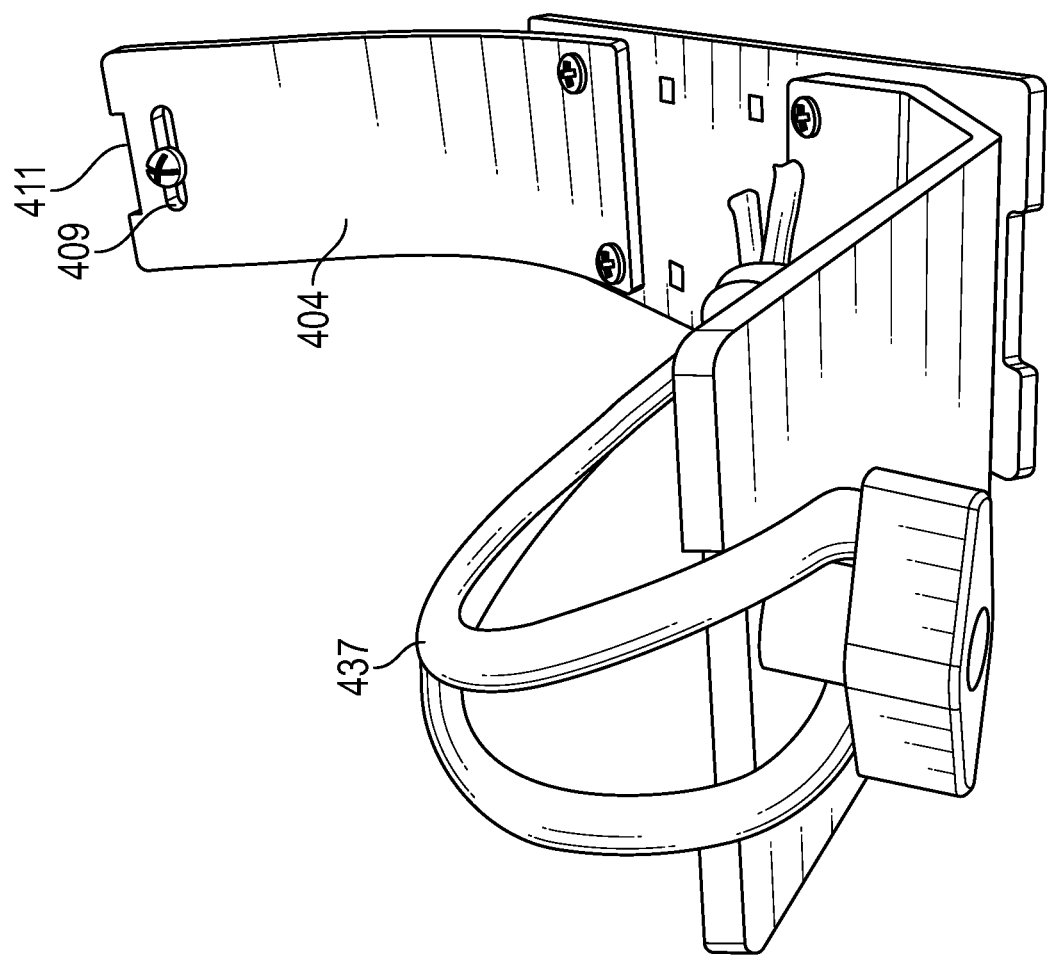
FIG. 35 is a perspective view of a bracket illustrating positioning of a shock cord around a portion thereof for the purpose holding an object within the bracket.

FIG. 35 is a perspective view of a bracket illustrating positioning of a shock cord around a portion thereof for the purpose holding an object within the bracket. As depicted, a fastener with a square shank and a wing nut can be disposed through the slot 409 at the free ends of brackets 404. A shock cord loop or other elongate elastic element 437 can be slung around the wings of the wing nut on the outer edge of the brackets to hold an object in place in the bracket.

Figure 36:
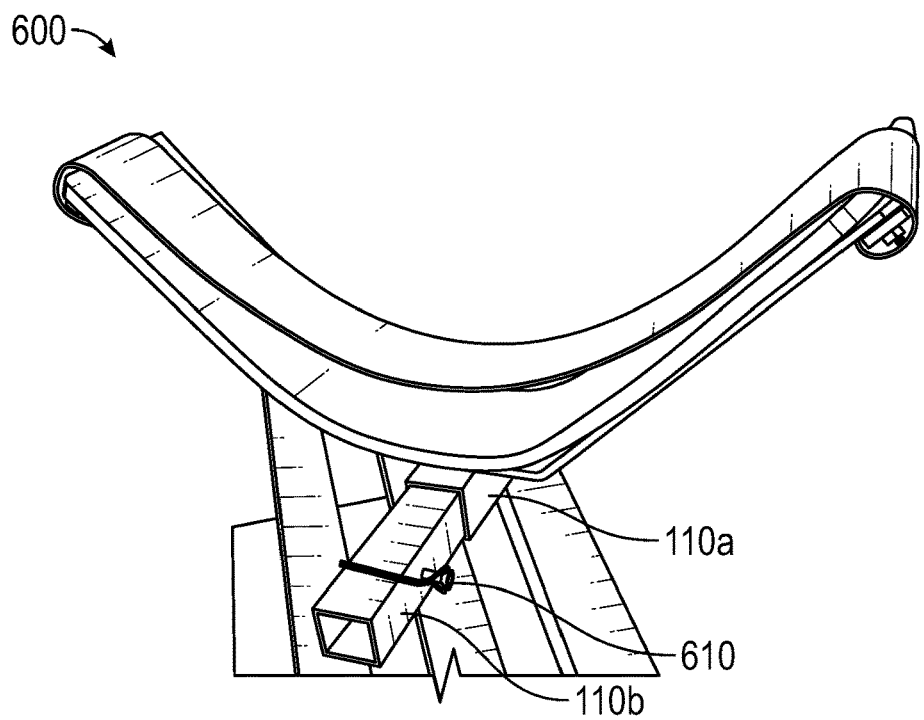
FIG. 36 is a perspective front view of a portion of a retention system that can be slid into a back end of an elongate rail to facilitate removal of the component to facilitate opening a hatchback vehicle.
Figure 37:
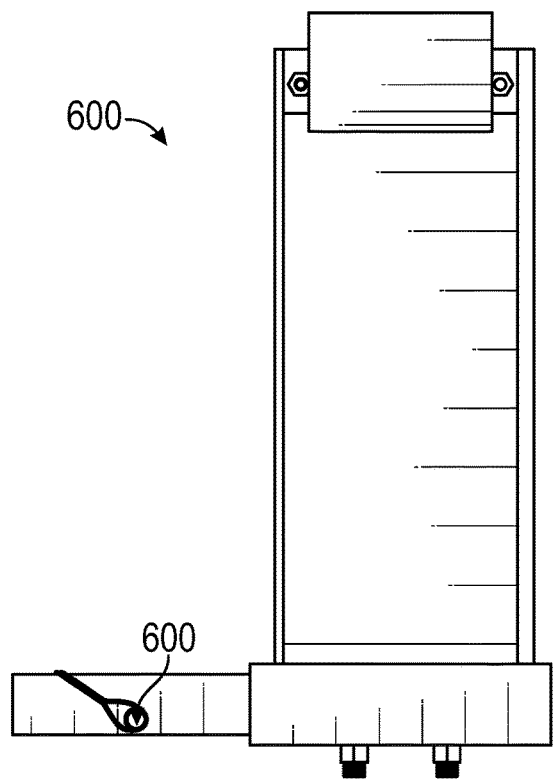
FIG. 37 is a perspective side view of the component illustrated in FIG. 37 with padding disposed thereon.

FIG. 36 is a perspective front view of a portion of a retention system that can be slid into a back end of an elongate rail to facilitate removal of the component to facilitate opening a hatchback vehicle. FIG. 37 is a perspective side view of the component illustrated in FIG. 37 with padding disposed thereon. Bracket 600 can be clamped, or bolded directly, to rail portion 110a. Rail portion 110b can be permanently or temporarily fixed to rail portion 110a and bracket 600. The lower dimensioned rail portion 110b can be removably received by a rear portion of an elongate rail coupled to a roof rack (not shown), and a pin 610 can be used to hold the assembly of FIG. 36 in place. This can be useful in that a main rail can be affixed to a vehicle or roof rack, and the rear and/or front portions including the brackets 600 can be removable to facilitate opening the hood or hatchback of the vehicle to avoid damage to the hood and hatchback.

Figure 38:
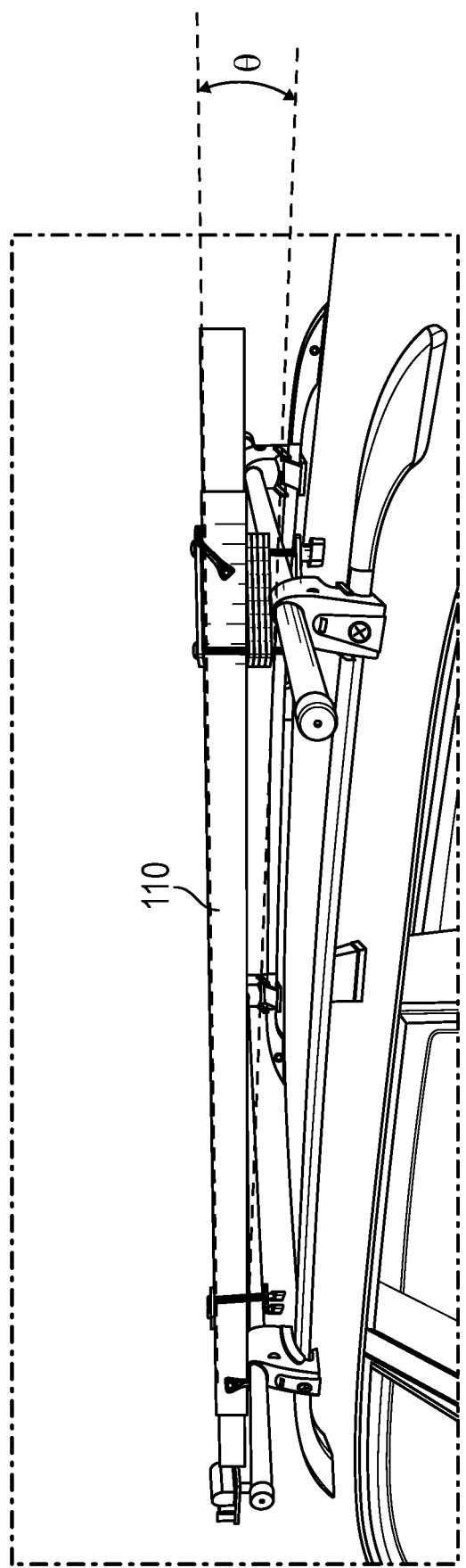
FIGS. 38-40 illustrate aspects of pitching the system in accordance with the present disclosure.
Figure 39:
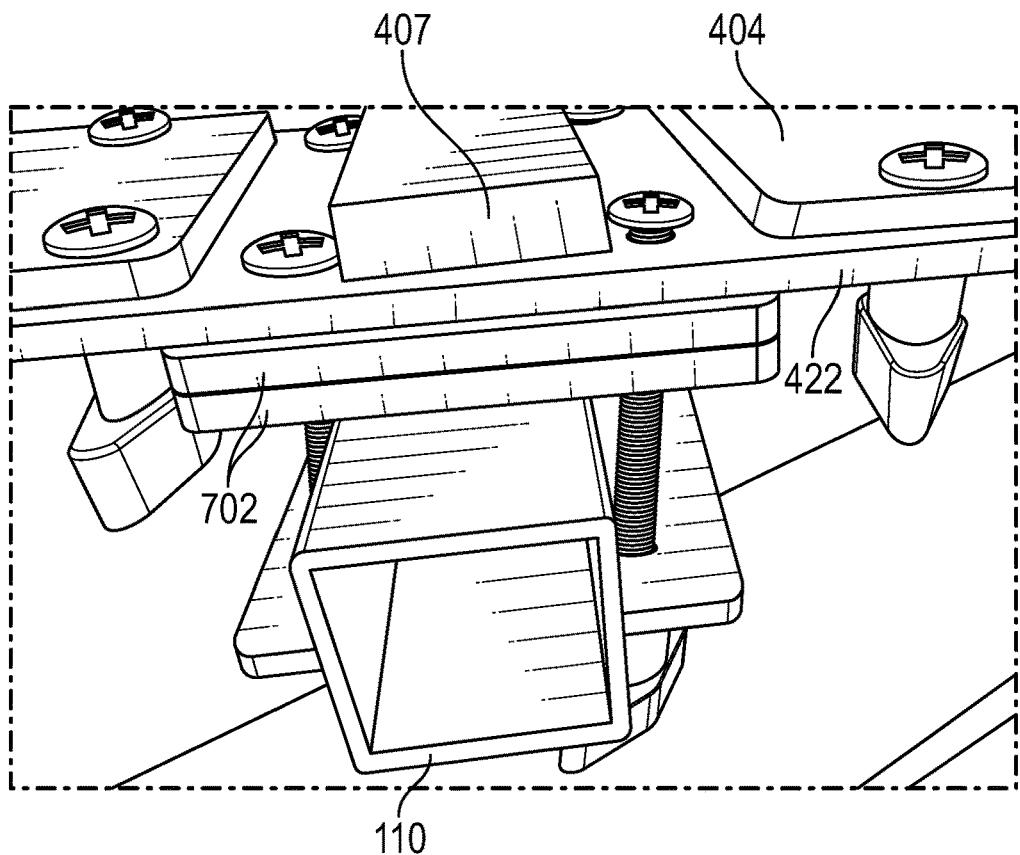
Figure 40:
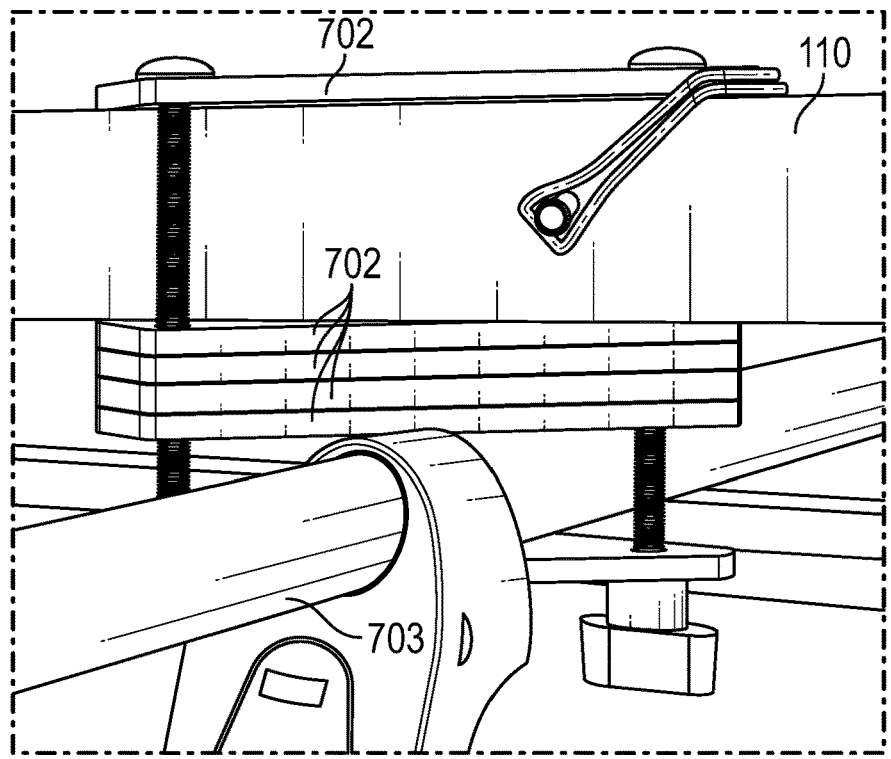

FIGS. 38-40 illustrate aspects of pitching the system in accordance with the present disclosure. For purposes of illustration, and not limitation, in some implementations, the object being carried such as a watercraft or other object, can be tilted, or pitched such that one end of the object is higher than the other. For example, the object may be lower towards the front of the vehicle and relatively higher at the back end of the vehicle. This can help prevent aerodynamic effects from causing the front of the object to lift while the vehicle is moving, and can also cause the rear of the object to be pushed downward by aerodynamic forces, which can be advantageous. This can be accomplished, in one implementation, by inserting one or more spacers, such as spacer blocks 702, between the elongate rail 100 and underlying structure such as the roof rack of the vehicle near the back of the vehicle. The elongate rail can be held in place by further plates or blocks 702 both above the rail 110 and below the roof rack 703 or other structure with a plurality of adjustable fasteners as illustrated in FIGS. 38 and 40. In another implementation as shown in FIG. 39, spacer blocks 702 can be inserted between the top of the elongate rail and the lower plate 422 of the cradle. The spacer blocks can have a plurality of holes defined therethrough for receiving a plurality of bolts. If desired, a pad 407 can be included as illustrated in this or other embodiments to more fully protect the object being transported. In a third implementation, the lengths or positioning of the straps (e.g., 500) can be adjusted in the front and rear cradle to cause the front end of the object being transported to be lower than the rear. Moreover, each of the aforementioned approaches can be used in combination to achieve pitching or tilting of the object being carried.

Figure 41:
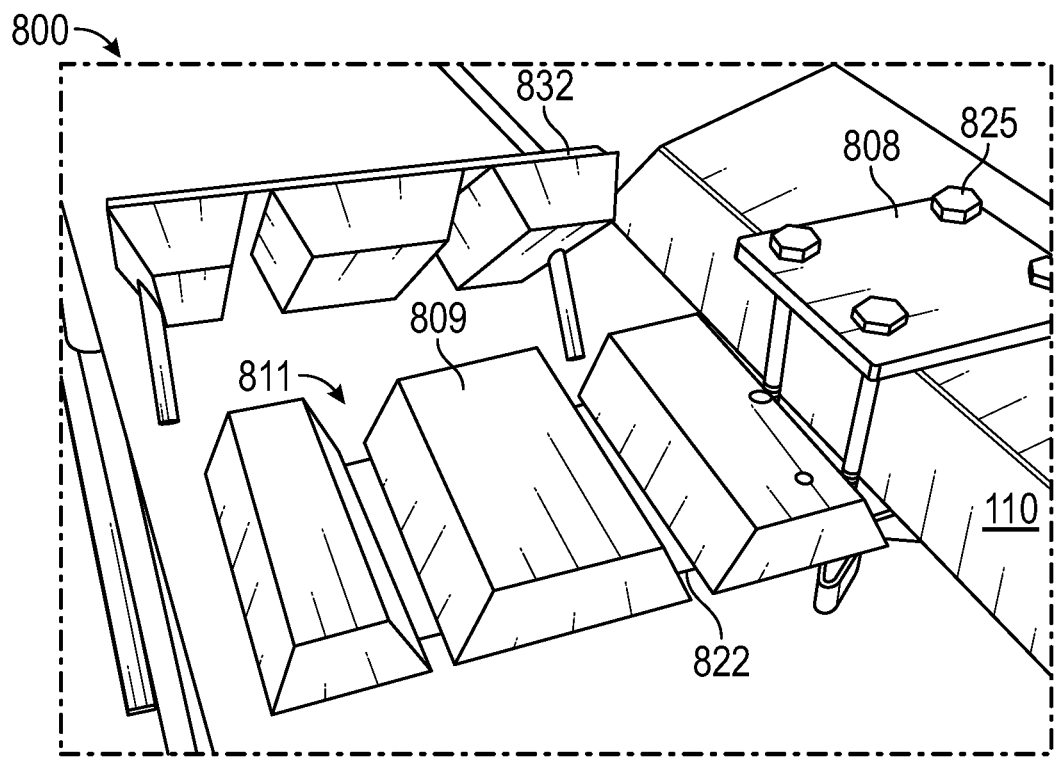
FIGS. 41-47 illustrate aspects of a further retainer, such as for oars, in accordance with the present disclosure.
Figure 42:
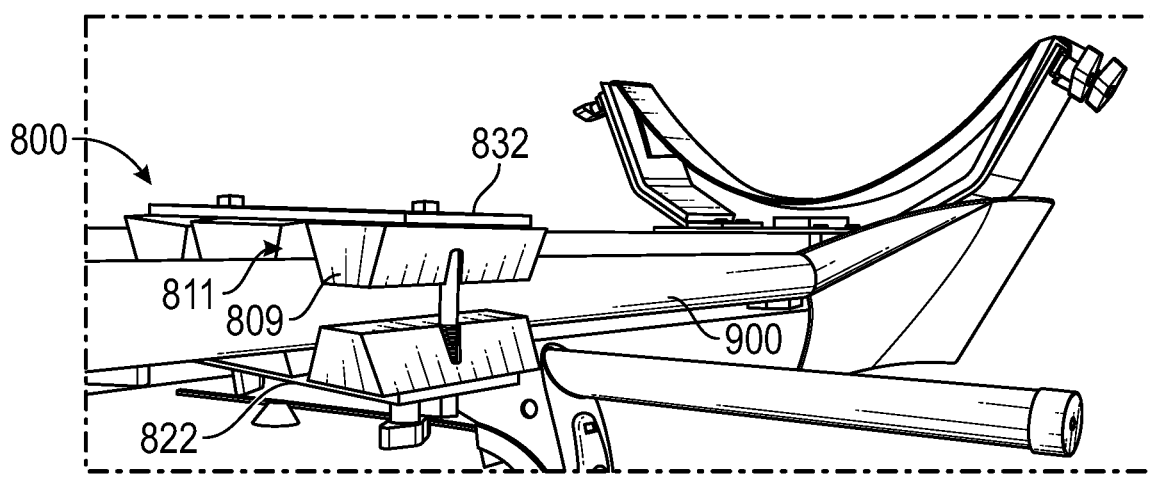
Figure 43:
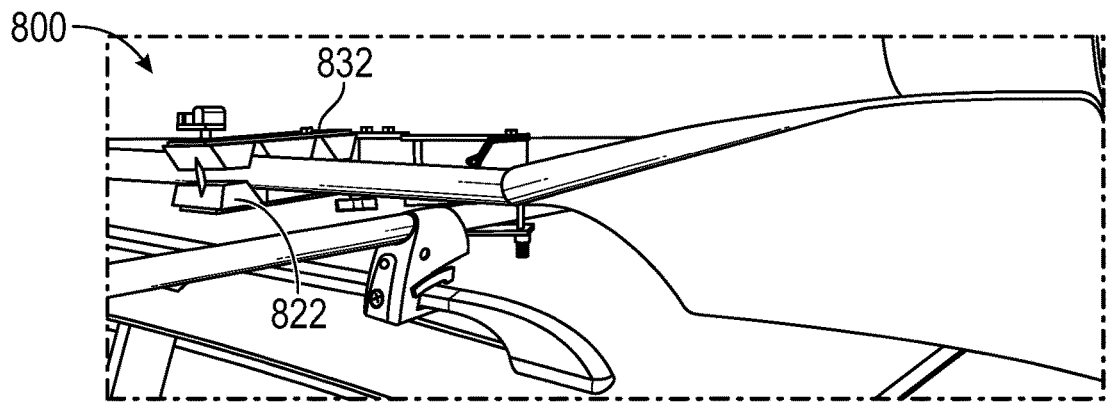

FIGS. 41-47 illustrate aspects of a further retainer, such as for oars, in accordance with the present disclosure. For purposes of illustration, and not limitation, a retainer or bracket assembly 800 can be provided for holding smaller elongate objects, such as oars, tools, pipes, and the like, wherein a first such assembly 800 can be provided toward the front of a vehicle, and a second toward the back. The bracket assembly includes a lower plate 822 that is bolted to the elongate rail 110, for example, using bolts or other fasteners 825 in a clamping arrangement with plate 808. The lower plate includes a plurality of padded blocks 809 attached thereto by adhesive or other means such as hook and loop fasteners, wherein gaps 811 are defined between the blocks 809 to hold the elongate articles 900. The assembly includes a further corresponding upper plate 832 that can include complementary padded blocks 809 forming similar gaps 811. The upper and lower plates can be selectively coupled using fasteners, for example, such as the bolts as presented in FIGS. 41-47. FIG. 41 shows the assembly 800 in a partly disassembled condition wherein the lower plate 822 is held against the underside of rail 110 by way of a bolted clamp connection. FIG. 42 shows a perspective view from the front of the vehicle toward the rear of the vehicle showing an oar 900 held in place within gap 811 between lower plate 822 and upper plate 832, held in place by padded blocks 809, which can be made from foam rubber, open or closed cell foams, or the like. FIG. 43 shows the opposing view from the rear of the vehicle facing toward the front of the vehicle.

Figure 44:
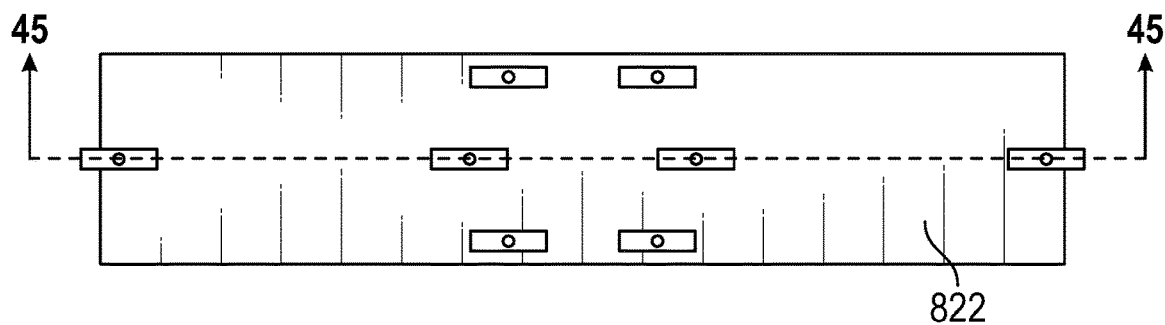
Figure 45:
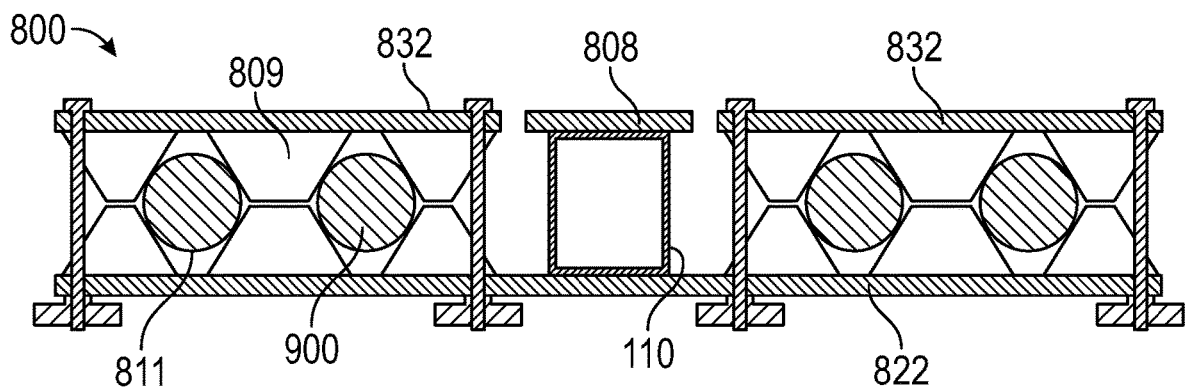
Figure 46:
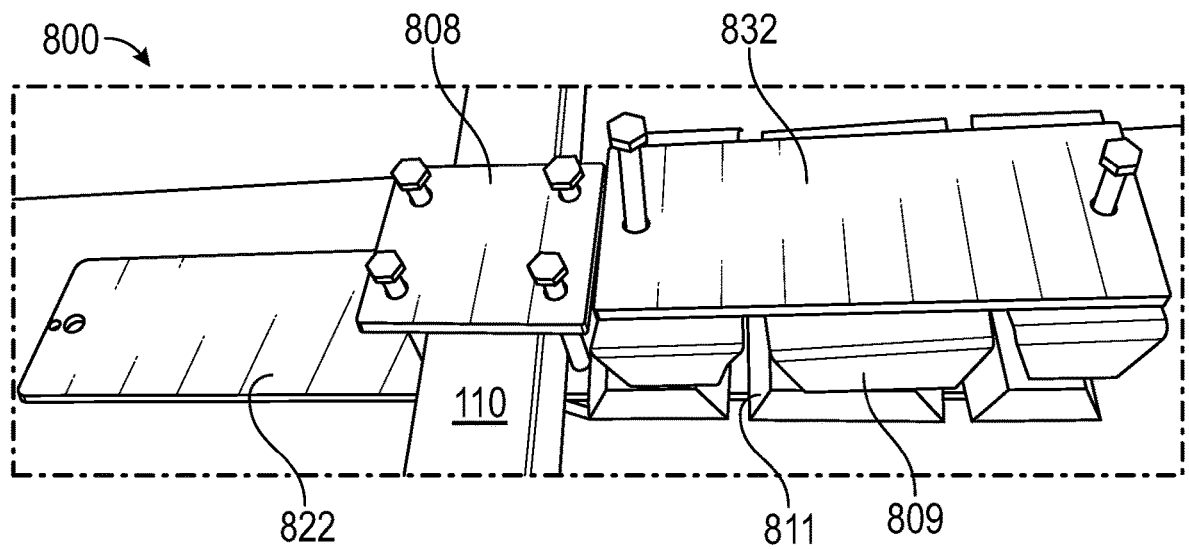
Figure 47:
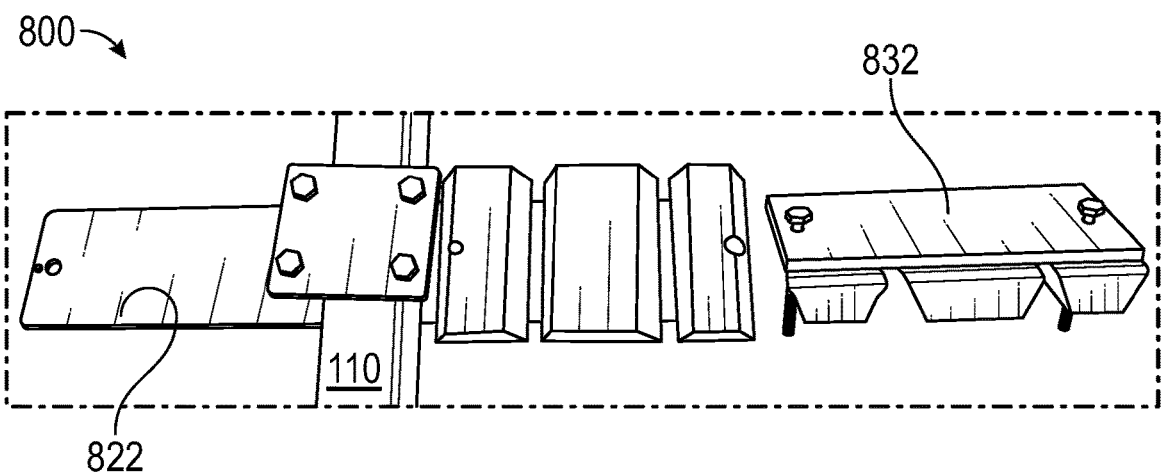

FIG. 45 shows a cross section of the assembly 800 when fully assembled, wherein the cross section is taken along the centerline of the assembly as set forth in the bottom view of FIG. 44. As can be seen, the plate 808 is held in place against elongate rail 110 and with lower plate 822 by four bolts with reference to FIGS. 44 and 45 that are not along the centerline of the assembly 800. The oars 900 or other elongate objects are held in place in gaps 811 defined between pads 809. One or both sides of the assembly can be used to carry oars, for example. Thus, the embodiment of FIG. 45 can carry four oars, wherein two are on each side of the rail 110. It will be appreciated that the assembly 800 can be configured to carry more or less objects 900, and can similarly be configured to carry objects on only one side of the rail, if desired. FIG. 46 illustrates an upper view of the assembly 800 showing relative placement of lower plate 822, upper plate 832, pads, gaps 811, and plate 808. FIG. 47 illustrates assembly 800 with plate 832 removed from lower plate 822.

It will be apparent to those skilled in the art that various modifications and variations can be made in the disclosed devices and methods without departing from the scope of the disclosure. Other aspects of the disclosure will be apparent to those skilled in the art from consideration of the specification and practice of the features disclosed herein. It is intended that the specification and examples be considered as exemplary only.

What is claimed is:

1. A system for securing articles to a vehicle, comprising:
   a longitudinal elongate rail traversing a longitudinal direction that is adjustable in length;
   at least one fastener to removably mount said longitudinal elongate rail to a portion of a vehicle;
   at least one spacer disposed between said portion of the vehicle and said longitudinal elongate rail to cause the longitudinal elongate rail to be oriented lower toward the front of the vehicle; and
   a plurality of supports adjustably mounted to the longitudinal elongate rail, wherein each said support in the plurality of supports is configured to removably receive a portion of an article to be secured to the vehicle, each said support in the plurality of supports being releasably clamped in place onto said longitudinal rail to selectively maintain the position of each said support stationary with respect to the longitudinal elongate rail, and further wherein an orientation of the at least one spacer causes a first support of the plurality of supports toward the front of the vehicle to be located at a lower relative vertical position with respect to a second support of the plurality of supports located toward a rear of the vehicle.

2. The system of claim 1, wherein said at least one spacer is a discrete component with respect to the longitudinal rail.

3. The system of claim 2, wherein the at least one spacer includes a plurality of stacked spacers.

4. The system of claim 1, wherein at least one of the supports includes a lateral rail releasably clamped to the elongate rail, the lateral rail being orthogonally oriented with respect to said longitudinal elongate rail, said lateral rail being configured to be releasably clamped along said longitudinal elongate rail.

5. The system of claim 1, wherein at least one of the supports includes a cradle releasably clamped to the elongate rail, the cradle being orthogonally oriented with respect to said longitudinal elongate rail.

6. The system of claim 5, wherein the cradle includes a pair of upwardly extending brackets releasably clamped to a lateral rail, said pair of upwardly extending brackets being configured to be releasably clamped along said lateral rail, wherein said lateral rail and said pair of upwardly extending brackets cooperate to form a concavity for at least partially surrounding a portion of an article to hold said article in position when mounted to said system, and further wherein the pair of upwardly extending brackets can be slid toward and away from one another along the lateral rail when the pair of upwardly extending brackets are not clamped to the lateral rail.

7. A system to secure articles to a vehicle, comprising:
   a longitudinal elongate rail traversing a longitudinal direction, the longitudinal rail including a flattened upper surface along its length across a width of the longitudinal elongate rail; and
   first and second cradles slidably mounted to the longitudinal elongate rail, wherein each of said cradles can be releasably clamped in place onto the rail to hold the position of the cradle stationary with respect to the longitudinal elongate rail, wherein each of said cradles includes:
      a lateral plate having a flattened lower surface releasably clamped to the flattened upper surface of the elongate rail, the lateral plate being orthogonally oriented with respect to said longitudinal elongate rail, wherein said lateral plate does not substantially contact a side portion of the longitudinal elongate rail; and
      at least one upwardly extending bracket releasably clamped to said lateral plate, said at least one upwardly extending bracket including a flattened lower plate portion configured to be clamped to the lateral plate, and an upwardly extending portion, wherein the at least one upwardly extending bracket is configured to be slid along the lateral plate, and further wherein at least one of the lateral plate and the at least one upwardly extending bracket includes at least one adjustment slot defined therethrough to permit relative movement of the at least one upwardly extending bracket and the lateral plate, and still further wherein at least one engageable clamping fastener extends through the lateral plate and the at least one upwardly extending bracket.

8. The system of claim 7, wherein clamped physical contact between the flattened upper surface of the longitudinal elongate rail and the flattened surface of the lateral plate maintains horizontal orientation of the lateral plate with respect to the longitudinal elongate rail.

9. The system of claim 8, further comprising a lower clamp plate disposed under the longitudinal elongate rail, and further wherein the lateral plate is clamped to the lower clamp plate by a plurality of fasteners, wherein the lateral plate and lower clamp plate have flattened surfaces that contact the longitudinal elongate rail that do not contact a side surface of the longitudinal elongate rail.

10. A system for securing articles to a vehicle, comprising:
   a longitudinal elongate rail traversing a longitudinal direction, wherein the longitudinal elongate rail is configured to be oriented lower toward the front of the vehicle when mounted to the vehicle, and further wherein a rear portion of the elongate rail is removable to create clearance for a rear hatch of a vehicle to open;
   at least one fastener to removably mount said longitudinal elongate rail to a portion of a vehicle; and
   a plurality of supports adjustably mounted to the longitudinal elongate rail, wherein each said support in the plurality of supports is configured to removably receive a portion of an article to be secured to the vehicle, each said support in the plurality of supports being releasably clamped in place onto said longitudinal rail to selectively maintain the position of each said support stationary with respect to the longitudinal elongate rail, and further wherein a first support of the plurality of supports toward the front of the vehicle is located at a lower relative vertical position with respect to a second support of the plurality of supports located toward a rear of the vehicle.

11. The system of claim 10, wherein at least one of the supports includes a lateral rail releasably clamped to the elongate rail, the lateral rail being orthogonally oriented with respect to said longitudinal elongate rail, said lateral rail being configured to be releasably clamped along said longitudinal elongate rail.

12. The system of claim 10, wherein at least one of the supports includes a cradle releasably clamped to the elongate rail, the cradle being orthogonally oriented with respect to said longitudinal elongate rail.

13. The system of claim 12, wherein the cradle includes a pair of upwardly extending brackets releasably clamped to a lateral rail, said pair of upwardly extending brackets being configured to be releasably clamped along said lateral rail, wherein said lateral rail and said pair of upwardly extending brackets cooperate to form a concavity for at least partially surrounding a portion of an article to hold said article in position when mounted to said system, and further wherein the pair of upwardly extending brackets can be slid toward and away from one another along the lateral rail when the pair of upwardly extending brackets are not clamped to the lateral rail.

* * * * *